United States Patent
Gattani et al.

(10) Patent No.: US 12,380,126 B2
(45) Date of Patent: Aug. 5, 2025

(54) DISCOVERY OF SOURCE RANGE PARTITIONING INFORMATION IN DATA EXTRACT JOB

(71) Applicant: Oracle International Corporation, Redwood Shores, CA (US)

(72) Inventors: Rohit Jaykumar Gattani, Pleasanton, CA (US); Rahul Gupta, Dublin, CA (US); Arun Patnaik, Fremont, CA (US); Vinod Murli Mamtani, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/084,421

(22) Filed: Dec. 19, 2022

(65) Prior Publication Data
US 2024/0202210 A1    Jun. 20, 2024

(51) Int. Cl.
G06F 16/00    (2019.01)
G06F 16/27    (2019.01)

(52) U.S. Cl.
CPC .................... *G06F 16/27* (2019.01)

(58) Field of Classification Search
CPC ....................................... G06F 16/27
USPC ................................ 707/600–899
See application file for complete search history.

(56) References Cited

U.S. PATENT DOCUMENTS 7,024,401 B2    4/2006  Harper et al.
7,814,142 B2    10/2010 Mamou et al.
10,356,150 B1 *  7/2019  Meyers .................. H04L 65/70
10,459,918 B1 *  10/2019 Edwards, Jr. ......... G06F 16/278
11,621,966 B1    4/2023  Yu et al.
(Continued)

FOREIGN PATENT DOCUMENTS

CN      110737683 A     1/2020
KR    20220096049 A     7/2022

OTHER PUBLICATIONS

"Dynamic Partitioning in Kinesis Data Firehose", Available Online at: https://docs.aws.amazon.com/firehose/latest/dev/dynamic-partitioning.html, 2022, 11 pages.
(Continued)

*Primary Examiner* — Charles Rones
*Assistant Examiner* — Shirley D Hicks
(74) *Attorney, Agent, or Firm* — Kilpatrick Townsend & Stockton LLP

(57) ABSTRACT

Techniques are described for the discovery of source range partitioning information. An example method includes a device determining a partition boundary value for the data based at least in part on the following steps. The device can determine a first plurality of bounded value sets and a second plurality of bounded value sets. The device can calculate a first average value of a first value and a second average value. The device can determine a first deviation value of the first average value from the first value and a second deviation value of the second average value from a third value. The device can determine the first partition boundary value based at least in part on the first deviation value and the second deviation value, the first partition boundary value being the first candidate partition boundary value or the second candidate partition boundary value.

20 Claims, 13 Drawing Sheets

(56) References Cited

U.S. PATENT DOCUMENTS

| | | |
|---|---|---|
| 2005/0160055 A1 | 7/2005 | Boulle |
| 2008/0313246 A1 | 12/2008 | Shankar et al. |
| 2011/0066593 A1* | 3/2011 | Ahluwalia .............. G06F 16/22 |
| | | 707/624 |
| 2012/0143090 A1 | 6/2012 | Hay et al. |
| 2015/0356149 A1 | 12/2015 | Dagli et al. |
| 2020/0125666 A1 | 4/2020 | Eadon et al. |
| 2020/0311062 A1 | 10/2020 | Mihm et al. |
| 2022/0261390 A1 | 8/2022 | Creasey et al. |
| 2024/0202210 A1 | 6/2024 | Gattani et al. |

OTHER PUBLICATIONS

"Patentability Search Report", Nov. 7, 2021, 15 pages.
"Source Partitioning", Amazon Redshift Connectors, Cloud Data Integration Connectors, Nov. 29, 2022, 1 page.
Ives et al., "Adapting to Source Properties in Processing Data Integration Queries", Available Online at: https://homes.cs.washington.edu/~alon/files/aqp04.pdf, Jun. 13-18, 2004, 12 pages.
Vieira , "Use PK Chunking to Extract Large Data Sets from Salesforce", Available Online at: https://developer.salesforce.com/blogs/engineering/2015/03/use-pk-chunking-extract-large-data-sets-salesforce, Mar. 23, 2015, 4 pages.
U.S. Appl. No. 18/225,827 , Notice of Allowance, Mailed on Dec. 6, 2024, 20 pages.
U.S. Appl. No. 18/225,827 , "Non-Final Office Action", Jun. 4, 2024, 19 pages.

* cited by examiner

DISCOVERY OF SOURCE RANGE PARTITIONING INFORMATION IN DATA EXTRACT JOB

BACKGROUND

A cloud service provider (CSP) can provide multiple cloud services to subscribing customers. These services are provided under different models, including a Software-as-a-Service (SaaS) model, a Platform-as-a-Service (PaaS) model, an Infrastructure-as-a-Service (IaaS) model, and others. In many instances, a cloud service provider can offer on-demand services.

BRIEF SUMMARY

Embodiments described herein are directed toward a method for the discovery of source range partitioning information. The method includes a computing device receiving, from a source system, a first set of values from data to be transmitted to a target system and a second set of values from the data to be transmitted to the target system.

The method can further include the computing device determining a partition boundary value for the data based at least in part on the following steps.

The method can further include the computing device determining a first plurality of bounded value sets based at least in part on the first set of values and a second plurality of bounded value sets based at least in part on the second set of values.

The method can further include the computing device determining a first average value of a third value of a first bounded value set of the first plurality of bounded value sets and a fourth value of a second bounded value set of the second plurality of bounded value sets, the first value corresponding to a first candidate partition boundary value.

The method can further include the computing device determining a second average value of a third value of a third set of bounded values of the first plurality of bounded value sets and a fourth value of a fourth set bounded values of the second plurality of bounded values, the third value corresponding to a second candidate partition boundary value.

The method can further include the computing device determining a first deviation value of the first average value from the first value.

The method can further include the computing device determining a second deviation value of the second average value from the third value.

The method can further include the computing device determining the first partition boundary value based at least in part on the first deviation value and the second deviation value, the first partition boundary value is the first candidate partition boundary value or the second candidate partition boundary value.

The method can further include the computing device transmitting, to the target system, the data, the data is partitioned using the first partition boundary value.

Embodiments can further include a computing device, including a processor and a computer-readable medium including instructions that, when executed by the processor, can cause the processor to perform operations including receiving, from a source system, a first set of values from data to be transmitted to a target system and a second set of values from the data to be transmitted to the target system.

The instructions that, when executed by the processor, can further cause the processor to perform operations including determining a partition boundary value for the data based at least in part on the following steps.

The instructions that, when executed by the processor, can further cause the processor to perform operations including determining a first plurality of bounded value sets based at least in part on the first set of values and a second plurality of bounded value sets based at least in part on the second set of values.

The instructions that, when executed by the processor, can further cause the processor to perform operations including determining a first average value of a third value of a first bounded value set of the first plurality of bounded value sets and a fourth value of a second bounded value set of the second plurality of bounded value sets, the first value corresponding to a first candidate partition boundary value.

The instructions that, when executed by the processor, can further cause the processor to perform operations including determining a second average value of a third value of a third set of bounded values of the first plurality of bounded value sets and a fourth value of a fourth set bounded values of the second plurality of bounded values, the third value corresponding to a second candidate partition boundary value.

The instructions that, when executed by the processor, can further cause the processor to perform operations including determining a first deviation value of the first average value from the first value.

The instructions that, when executed by the processor, can further cause the processor to perform operations including determining a second deviation value of the second average value from the third value.

The instructions that, when executed by the processor, can further cause the processor to perform operations including determining the first partition boundary value based at least in part on the first deviation value and the second deviation value, the first partition boundary value is the first candidate partition boundary value or the second candidate partition boundary value.

The instructions that, when executed by the processor, can further cause the processor to perform operations including transmitting, to the target system, the data, the data is partitioned using the first partition boundary value.

Embodiments can further include a non-transitory computer-readable medium having stored thereon instructions that, when executed by a processor, causes the processor to perform operations including receiving, from a source system, a first set of values from data to be transmitted to a target system and a second set of values from the data to be transmitted to the target system.

The instructions that, when executed by the processor, can further cause the processor to perform operations including determining a partition boundary value for the data based at least in part on the following steps.

The instructions that, when executed by the processor, can further cause the processor to perform operations including determining a first plurality of bounded value sets based at least in part on the first set of values and a second plurality of bounded value sets based at least in part on the second set of values.

The instructions that, when executed by the processor, can further cause the processor to perform operations including determining a first average value of a third value of a first bounded value set of the first plurality of bounded value sets and a fourth value of a second bounded value set of the second plurality of bounded value sets, the first value corresponding to a first candidate partition boundary value.

The instructions that, when executed by the processor, can further cause the processor to perform operations including determining a second average value of a third value of a third set of bounded values of the first plurality of bounded value sets and a fourth value of a fourth set bounded values of the second plurality of bounded values, the third value corresponding to a second candidate partition boundary value.

The instructions that, when executed by the processor, can further cause the processor to perform operations including determining a first deviation value of the first average value from the first value.

The instructions that, when executed by the processor, can further cause the processor to perform operations including determining a second deviation value of the second average value from the third value.

The instructions that, when executed by the processor, can further cause the processor to perform operations including determining the first partition boundary value based at least in part on the first deviation value and the second deviation value, the first partition boundary value is the first candidate partition boundary value or the second candidate partition boundary value.

The instructions that, when executed by the processor, can further cause the processor to perform operations including transmitting, to the target system, the data, the data is partitioned using the first partition boundary value.

DETAILED DESCRIPTION

Figure 1:
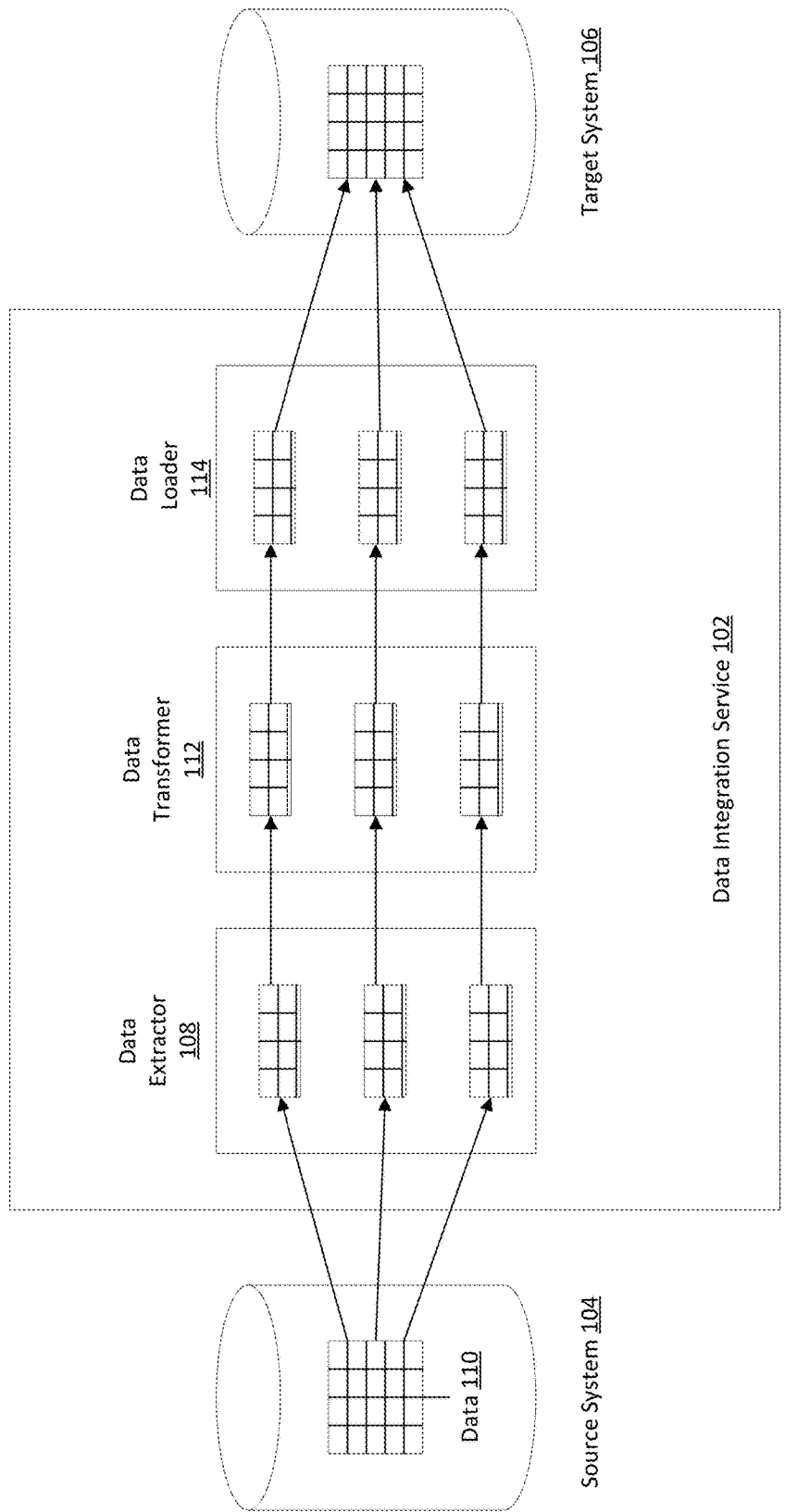
FIG. 1 is an illustration of a data migration using a discovery of source range partitioning information, according to one or more embodiments.

In the following description, various embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

A cloud service provider (CSP) can offer a data integration service for transmitting data from a source system to a target system. The data integration service can be implemented using a cloud service infrastructure, including the cloud service's servers, and networking capabilities. The CSP can accept a data integration job request to migrate data from one system to another system. For example, a customer may need to analyze some data and request that a portion of the customer's data be retrieved from the customer's database and transferred to a data warehouse for performing the analysis. In some instances, the data stored at the data entity (e.g., the source system from which data can be extracted) can be a very large data set (e.g., terabytes of data). Thus, in order to for the data integration service to achieve an optimal data extraction performance, the data can be extracted in a partitioned manner. For example, the data integration service can use a partitioning technique to extract the large amount of data in smaller chunks/pieces. The data integration service can further employ a set of virtual machines to transmit the data chunks/pieces to the target system in parallel. This can improve the overall performance of data integration job.

In order to extract the data in a partitioned manner, the data integration service can receive partitioning information to be used to determine how to partition the data into the chunk/pieces. The data integration service can receive this partitioning information through various manners. For example, the source system can include partitioning information as to how to partition the data for extraction. In another example, the customer can provide partition information to the data integration service. One issue that can occur is if the source system does not include partitioning information, or if the customer is unable to or has not provided partitioning information. A data migration service can elect to define partitioning parameters. However, improper data partitioning can lead to unwanted data reorganization, too many partitions can lead to excessive task scheduling, too few partitions can lead to excessive memory and processing issues, and skewed data partitions can lead to uneven workloads between processing units.

Embodiments of the present disclosure address the above-referenced issues by providing techniques for automated discovery of source range partitioning in a data extraction job. The herein described techniques can be used to discover partitioning information to be used to partition and extract data from a source system. A user can request a data integration service to extract data from a source system and transmit the data to a target system. A data extractor of the data integration service can communicate with a source system to determine whether the source system includes partitioning information. If the partitioning information is available, the user can elect to partition the data pursuant to the information. If the source system does not have partition information, or if the user elects not to use the source system's partition information, the user can either provide partitioning information or request that a data extractor perform the discovery of partitioning information.

The data extractor can rely on four components to discover partitioning information: a partitioning discoverer, a sampler, a profiler, and a recommender. The data extractor can send a request to the partitioning discoverer to gather and provide source partitioning information for the data stored at the source system. The partitioning discoverer can send a request to the sampler to gather and provide training and validation sample sets of the data stored at the source system. The data can be structured as a table of values at the source system. In some instances, the request can include user preferences for selecting a partitioning column. The partitioning column can be a data table column whose values are amenable to being divided into data ranges and used to form the partitions. The sampler can extract requested sample data from the source system and transmit the training and validation sample sets of the data to the partitioning discoverer.

The partitioning discoverer can receive the training and validation sample sets of the data from the sampler. The partitioning discoverer can transmit the training and validation sample sets of the data to the profiler along with a request for data ranges to partition the data at the source system. In some instances, the partitioning discoverer can further transmit a required number of partitions to the profiler. The profiler can analyze the training and validation sample sets and generate candidate data ranges from the training sample sets. The profiler can further transmit the candidate data ranges back to the partitioning discoverer.

The recommender can analyze the candidate data ranges for each sample and recommend a set of data ranges for partitioning the data stored at the source system. The recommender can further transmit the recommended data ranges to the partitioning discoverer. The partitioning discoverer can transmit partitioning information, including the data ranges for the partitions, to the data extractor. The data extractor can extract data from the source system using the partitioning information and transmit the partitioned data to a target system. In some instances, the data at the source system may not be uniformly distributed. The embodiments described herein permit the data extractor to partition the data in equal divisions across a first element and a last element of the data to be partitioned.

FIG. 1 is an illustration 100 of a data transmission using a discovery of source range partitioning information, according to one or more embodiments. A data integration service 102 can receive instructions from a user to transmit data from a source system 104 to a target system. The data integration service 102 can employ a data extractor 108 that is configured to discover source range partitioning information from the source system 104. The data integration service 102 can be a service offered by a cloud services provider and can be implemented using one or more servers of a cloud service infrastructure. Each of the servers can employ one or more virtual machines to employ the functionality described herein. The source system can include one or more databases that store information to be transmitted to the target system 106.

The source system 104 can store the data 110 that is to be transferred to the target system 106. The size of the data 110 can be large enough that transmitting the data as a single block is impractical. Therefore, the data integration service 102 can look for partitioning information to partition the data 110. The data integration service 102 can determine whether the source system 104 includes partitioning information, such as data ranges for partitioning the data 110. The data integration service 102 can also look to whether the user that requested the data to be transferred has provided any partitioning information. If neither the source system 104 nor the customer can provide partitioning information, the data extractor 108 can perform a discovery to determine source range partitioning information. Examples for the discovery of source range partitioning information are provided below with respect to FIG. 1. More specific examples with example numerical values and illustrations are provided with respect to FIGS. 3-6.

The data extractor 108 can transmit a request to a partitioning discoverer to provide source partitioning information for a given source system. The partitioning discoverer can transmit a request to a sampler to provide training and validation sample sets from the source system 104. Wherever practicable, the sampler can push the random sampling task onto the source system 104. In some instances, the sampler can also extract the sample data from the source system 104 using a sampling technique.

The data at the source system can be stored as a table. The sampler can create multiple groups of training sample sets and validation sets. Each group can include multiple training sample sets and multiple validation sample sets. Each training sample set can include m-number of randomly sampled values. Each validation sample set can include n-number of randomly sampled values. The sampler can transmit the group(s) of training sample sets and validation sample sets to the partitioning discoverer.

The partitioning discoverer can transmit the group(s) of training sample sets and validation sample sets, and a request for candidate data ranges to the profiler. The profiler can identify a column of the table to be used as a partitioning column. The partitioning column can be a column of values that are amenable to be divided for partitioning purposes. For example, a table can include five columns and thirty rows. The partitioning column can be an index column that includes a respective index value for each of the thirty rows. The profiler can further generate candidate data ranges of values. For each training sample set, the profiler can generate a uniform histogram for partitioning column values, where bin/buckets for the histogram are equal to a number of partitions required. This can be achieved by the profiler sorting the values of each training sample set into ascending or descending order, and then dividing the values into equal-sized buckets. Each bucket can have a value that is lower boundary value and a value that is the higher boundary value. For example, if a bucket included the values 1, 2, and 3, 1 can be the lower boundary value and the 3 can be the higher boundary value. The profiler can adjust the boundary values of the buckets to cover all values. Therefore, the mean of the last value from $n^{th}$ bucket and first value from $(n+1)^{th}$ bucket would be the new upper boundary value for $n^{th}$ bucket and lower boundary value for $(n+1)^{th}$ bucket. The profiler can generate candidate data ranges for each training sample. The candidate data ranges can be transmitted to a partitioning discoverer, which can then transmit the candidate data ranges to a recommender along with a request for final data ranges.

The recommender can generate a recommendation for the final source range partitioning information. The recommender can calculate the absolute deviation of each boundary value of ranges (e.g., an absolute deviation between a given upper boundary value or lower boundary value and the upper or lower boundary values from other training sample sets). The recommender can then cumulate the absolute deviations of all boundary values for each training sample and rank the partitioning of the training sample sets. Each training sample set can then be ranked based on cumulative absolute deviation value. For example, the training sample set with the least cumulative absolute deviation can be the highest ranked.

The recommender can further validate the highest ranked training sample set. Starting with the highest ranked training sample set, the recommender can generate a histogram against the validation sample set. If the histogram is uniformly distributed, the training sample set can be selected as including the final source partitioning information. If the highest ranked training set does not produce a uniform histogram, the recommender can validate the next highest ranked training set. If none of the training sample sets results in a uniform distribution, the data extractor can reperform the process. The partitioning information provides the data ranges of the partitioning column from where each partition is to begin and where each partition is to end. For example, if the source system includes a table of five columns and twelve rows (0-11) and the partitioning information indicates that the data ranges are 0-2, 3-5, 6-8, and 9-11, the data extractor can partition the data as follows: the first partition includes all values of rows 0-2 of the table, the second partition includes all values of rows 3-5 of the table, the third partition includes all values of rows 6-8 of the table, and the fourth partition includes all values of rows 9-11 of the table. The data extractor 108 can assign a respective virtual machine to identify, process, and transmit each partition.

The data extractor 108 can extract the data 110 from the source system 104 using the partitioning information received from the recommender and transmit the partitioned data to a data transformer 112. The data transformer 112 can transform the format of the partitioned data from the source system's format to the target system's format. The data transformer 112 can transmit the transformed data to a data loader 114. The data loader 114 can load the partitioned data onto the target system 106. The target system 106 can reassemble the partitioned data.

Figure 2:
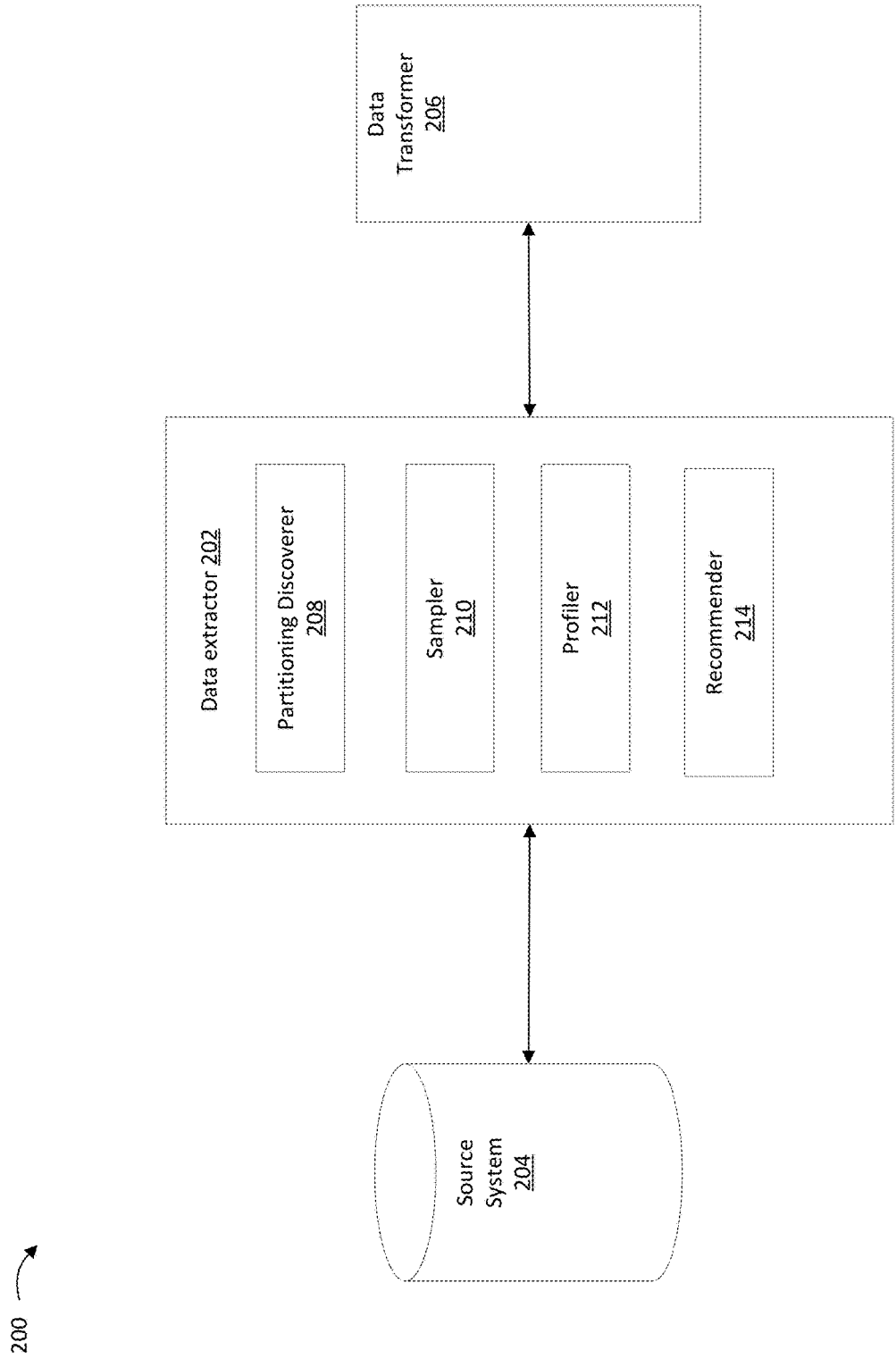
FIG. 2 is an illustration of a data extractor for discovery of source range partitioning, according to one or more embodiments.

FIG. 2 is an illustration 200 of a data extractor for the discovery of source range partitioning, according to one or more embodiments. As illustrated, the data extractor 202 can be in operable communication with a source system 204 and a data transformer 206, where each can be implemented by one or more computing devices. The data extractor 202 can be part of a data integration service of a cloud service provider. The data extractor can employ one or more units for the discovery of source range partitioning information. The data extractor 202 can use the units to determine data ranges to partition data stored at the source system 204 based on a statistical analysis of sample data from the source system 204.

The partitioning discoverer 208 can receive control instructions for performing the discovery of source range partitioning information. The control instructions can include an identity of the source system 204 and a description of data to be extracted and transmitted from the source system 202 to a target system. The description can include a data type, a format, size, and address(es) for the data. In response to the control instructions, the data extractor 202 can transmit a request to the partitioning discoverer for partitioning information, including a number of partitions and the boundaries for each partition.

The partitioning discoverer 208 can transmit a request to the sampler 210 for a set of training sample sets and validation sample sets from the data in the source system 202 to be transmitted to the target system. The training sample sets can be used to determine the number of partitions and the boundaries of each partition. The validation sample sets can be used to validate the determined the number of partitions and the boundaries of each partition.

The sampler 210 can either rely on the source system 204 to provide sample data or use one or more sampling techniques to sample data from the source system 204. For example, the data can be stored at the source system 202 as a data table with metadata providing descriptions of column and row values. The sampler 210 can retrieve one or more columns of data and one or more associated rows of data from the source system 202. The sampler can retrieve multiple samples from the source system 202 that can be used as training sample sets and validation sample sets and provide the samples to the partitioning discoverer 208.

The partitioning discoverer 208 can transmit the training sample sets and validation sample sets to the profiler 212 along with a request for a list of candidate data ranges. Data ranges can be numerical (e.g., time stamps, numeric values) that can be divided to form partitions. For example, consider a database of employee information, where the information includes the ages of the employees. The data ranges can be ranges of employees ages and the employee data can be partitioned based on which age range an employee falls within.

The data can be stored at the source system 202 as a table and the profiler 212, based on instructions from the sampler, can select a partitioning column. The partitioning column values can be a range of values. To select a partitioning column, the profiler 212 can determine whether the column values of each column can be partitioned into ranges (e.g., timestamps, numeric values) and give preference to columns with values that cannot be partitioned. The profiler 212 can further determine whether any candidate column is a key column or an index column and give a key column or an index column preference over a non-key or non-index column. A key column or an index column can be a column that includes values that uniquely identify the rows of the column.

The profiler 212 can further determine whether the user has provided any criteria for selecting a partition column and give any columns that match the user criteria over columns that do not match the user's criteria. The profiler 212 can rank all columns against one another based on datatype, key information, and user preference to select a partitioning column. If no columns are identified as the partitioning column, the profiler 212 can use a range discovery algorithm to select the partitioning column. The profiler 212 can further sample values from the selected partitioning column to generate the group(s) of training sample sets and validation sample sets. For example, if a partitioning column includes the values 0-50, the sampler 210 can generate a training sample set of values 23, 25, 35, 44, and 49.

The profiler 212 can analyze the group(s) of training sample sets and, for each group, determine a candidate number of partitions. The profiler 212 can further select the candidate number of partitions for the partitioning column based at least in part on the following: resources available to the data extractor 202 (e.g., processor cores, threads); consumption capacity of a subsequent data processing engine; and an ideal and acceptable parallel data extraction session allowed by the source system 204. The profiler 212 can create a data structure (e.g., histogram, table, list) for each training sample set, where values are divided into buckets. The number of buckets can be equal to the number of determined partitions. Each bucket can include a range of values. The profiler 212 can equally divide the values, such that each bucket includes the same number of values. For example, if a training sample set included the values 1, 3, 76, 56, 44, 46, 58, and 99, the profiler can create a first bucket that includes the values 1, 3, 44, and 46; and a second bucket that includes the values 56, 58, 76, and 99. The profiler 212 can further adjust the boundary values of the buckets to cover all values. For example, the profiler 212 can adjust the boundary values for the first bucket from 1 and 46 to 1 and 50, and the profiler 212 can adjust the boundary values of the second bucket from 56 and 99 to 51 and 99. The profiler 212 can transmit the data ranges including the adjusted boundary values (e.g., 1-50 and 51-99) for each training sample to the partitioning discoverer 208.

The partitioning discoverer 208 can transmit the respective partitioning column and partitioning boundaries for each training sample set to the recommender 214 to determine the final partitioning information. The recommender 214 can calculate a cumulative absolute deviation for each training sample set as follows: determining an absolute deviation of each boundary range of each training sample data set, determining the respective sum of the absolute deviations of the boundary ranges for each training sample set, and ranking the partitioning boundaries of each random sample data set based at least in part on the respective sum of the absolute deviations.

The recommender 214 can further generate a graphical representation (e.g., histogram) for the highest ranked random sample data to determine if there is a uniform distribution. If there is a uniform distribution, the recommender 214 can recommend the number of partitions, partition, and boundary ranges associated with the highest ranked random sample data set. If there is no uniform distribution, the recommender 214 continues to evaluate each next ranked random sample data set until a uniform distribution is detected.

The data extractor 202 can partition the data stored at the source system 202 based on the recommended number of partitions, partition column, and data ranges. The data extractor 202 can extract the partitions in a parallel and send the partitions to the data transformer 206.

Figure 3:
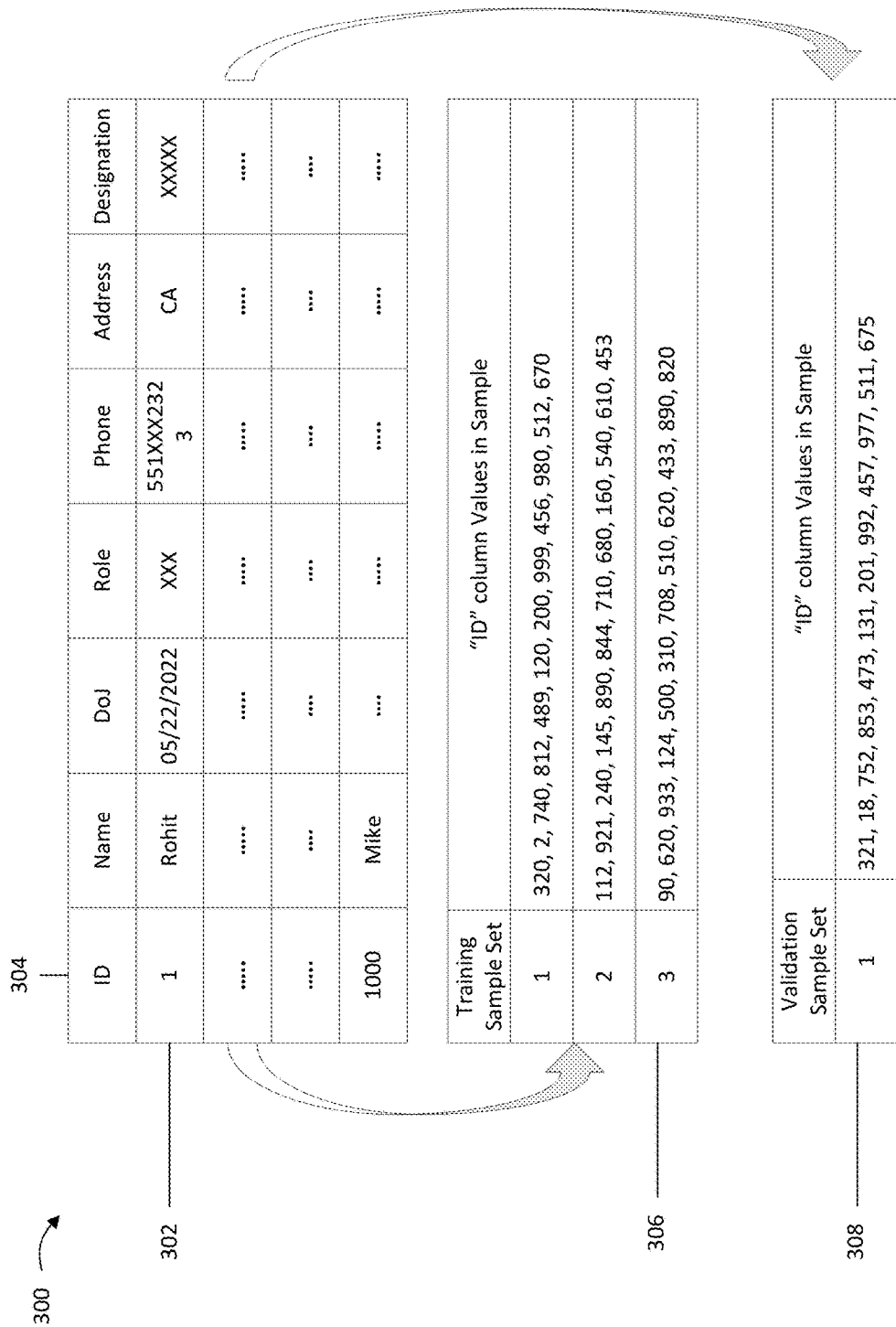
FIG. 3 is an illustration of a data sampling from a source system, according to one or more embodiments.

FIG. 3 is an illustration of a data sampling from a source system, according to one or more embodiments. A source system can store data 302, such as an employee table in a relational database. Furthermore, a user can request that a data integration service transmit the data 302 from the source system to a target system. As illustrated, the data 302 is structured as a table with seven columns, including an identifier (ID) column 304. The ID column 304 can include a unique index number for each row from 1 to 1000. Each row of the ID column 304 can be associated with a column value for name, date of joining (DoJ), role, phone, address, and designation.

The data integration service can instruct a data extractor to extract the data 302 from the source system to transmit to a target system. The data extractor can communicate with the source system and the user to determine whether either the source system or the user can provide partitioning information. Based on neither the source system nor the user providing partitioning information, the data extractor can further request a partitioning discoverer perform discovery of source range partitioning information and provide said information.

The partitioning discoverer can transmit a request to a sampler to retrieve training sample sets and validation sample sets from the source system. As illustrated, the sampler has generated a group of three training sample sets 306 and a validation sample set 308, where the first training sample set includes the values 320, 2, 740, 812, 489, 120, 200, 999, 456, 980, 512, and 670; the second training sample set includes the values 112, 921, 240, 145, 890, 844, 710, 680, 160, 540, 610, and 453; and the third training sample set includes the values 90, 620, 933, 124, 500, 310, 708, 510, 620, 433, 890, and 820. As further illustrated, the validation sample set 308 includes the values 321, 18, 752, 853, 473, 131, 201, 992, 457, 977, 511, and 675 from the ID column 304. It should be appreciated that the sampler can create any number of groups of training sample sets and validation sample sets with any number of training sample sets and validation sample sets and is not limited to one group of three training sample sets and one validation sample set.

Figure 4:
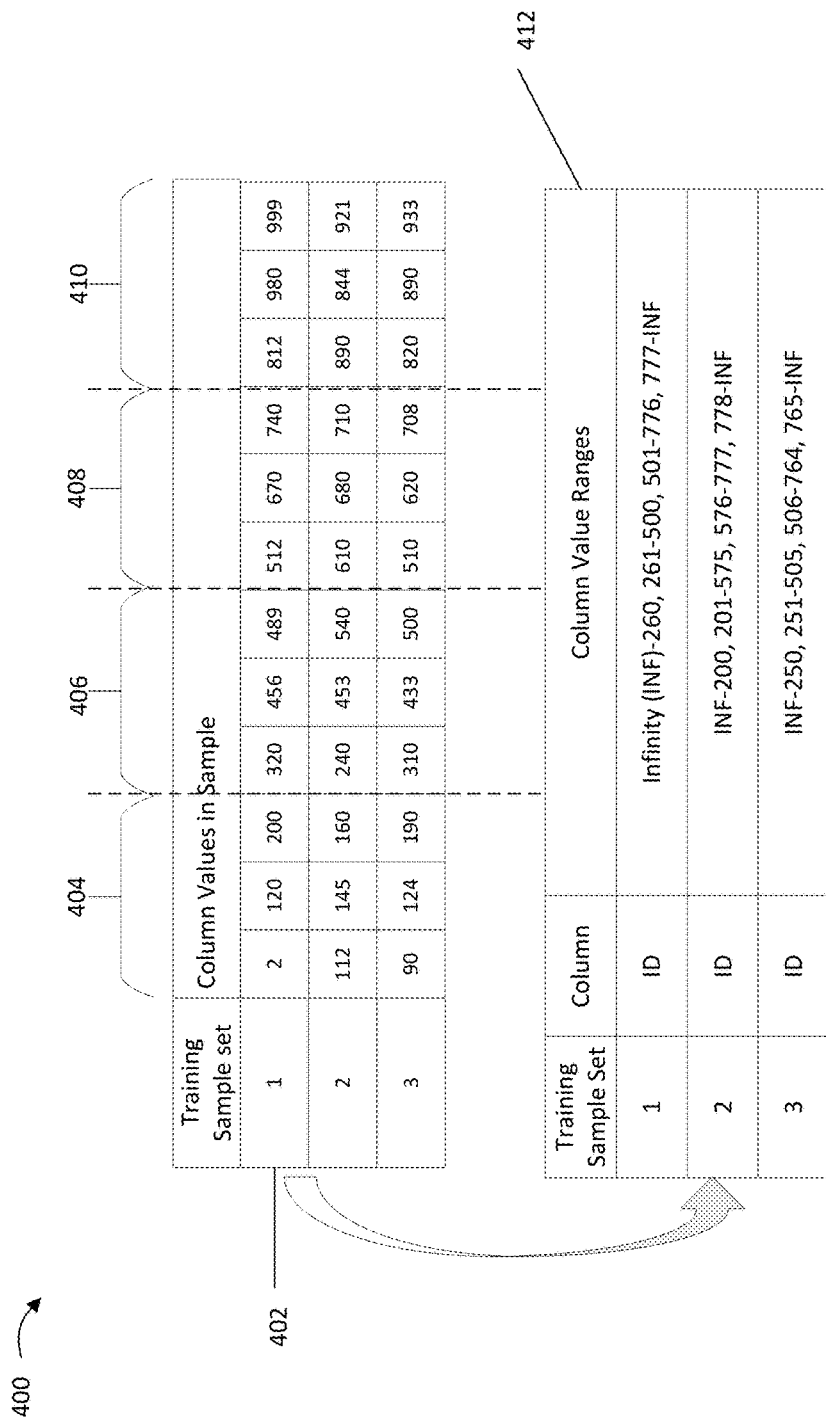
FIG. 4 is an illustration of determining data ranges for partitioning data, according to one or more embodiments.

FIG. 4 is an illustration 400 of determining data ranges for partitioning data, according to one or more embodiments. The profiler can create a bucket table 402 for each training sample set. The profiler can further select the ID column 404 as the partitioning column and reorganize the sampled values of the ID column 304 of FIG. 3 into ascending or descending order. As illustrated, each of the ID column values for the first training sample set, second training sample, and third training sample set have been organized into ascending order. For example, for the first training sample set, the ID column values 320, 2, 740, 812, 489, 120, 200, 999, 456, 980, 512, and 670 have been reorganized to ascending order from 2, 120, 200, 320, 456, 489, 512, 670, 740, 812, 980, to 999.

The profiler can further divide each training sample set into equal-sized buckets. For example, the profiler can perform a mathematical operation to determine the number of values in each training sample set, and then divide the value into equal-sized buckets. As illustrated, the profiler can determine that each training sample set includes twelve ID column values and divide each training sample set into a respective first bucket 404, second bucket 406, third bucket 408, and fourth bucket 410, where each bucket includes three ID column values. For example, for the first training set the first bucket 404 includes the ID column values 2, 120, and 200; the second bucket 406 includes the ID column values 320, 456, and 489; the third bucket 408 includes ID column values 512, 670, and 740; and the fourth bucket 410 includes the ID column values 812, 980, and 999. It should be appreciated that the profiler can use multiple groups of training sample sets to create multiple instances of buckets to determine an optimal number of partitions. As illustrated, the profiler has created four buckets for one scenario instance. The profiler could also use this same group of training sample sets to create a three bucket scenario instance, or another group of training sample sets to create a same number of buckets or different number of buckets.

The profiler can then use the bucket table 402 to create a data range table 412. The sampler can sample a subset of the values, but not all values are included in the sample sets. When the data 302 is eventually partitioned, the non-sampled values can be included in the partitions, so that all of the data 302 can be transmitted from the source system to the target system. Therefore, the profiler can adjust the boundary values of the buckets to include all of the values of the partitioning column. The profiler can determine the lower and upper boundary values of the buckets and select adjusted values between the upper boundary value of one bucket and the lower boundary value of an adjacent bucket. In some embodiments, the adjusted boundary values can be based on a midpoint between the upper boundary value of one bucket and the lower boundary value of an adjacent bucket. In other embodiments, the adjusted boundary values can be based on some other point between the upper boundary value of one bucket and the lower boundary value of an adjacent bucket.

As illustrated for the first training sample set, the upper boundary value of the first bucket 404 is 200 and the lower boundary value for the second bucket 406 is 320. The profiler can calculate the midpoint between the upper boundary value of the first bucket 404 and the lower boundary value of an adjacent second bucket 406 to reach a midpoint of 260 (e.g., ((200+320)/2)=260). The profiler can further adjust the upper boundary value of the first bucket 404 from 200 to 260 and adjust the lower boundary value of the second bucket from 320 to 261. In this sense, the ID column values 201-260 and ID column values 261-319 can be considered in a final partitioning. The profiler can make similar calculations for the lower boundary values and upper boundary values for each of the buckets of each of the first, second, and third training sample sets.

As seen in the data range table 412 for the first training sample set, the boundary values have been adjusted to include the following data ranges: infinity to 260, 260 to 500, 501 to 776, and 777 to infinity. The boundary values for the second training sample set and the third training sample set have also adjusted to the midpoints of the upper boundary value of one bucket and the lower boundary value of an adjacent bucket. The outer boundaries for each of the training sample sets can be adjusted to infinity. For example, for the first training sample set, the lower outer boundary has been adjusted from 2 to infinity and the upper outer boundary has been adjusted from 999 to infinity.

Figure 5:
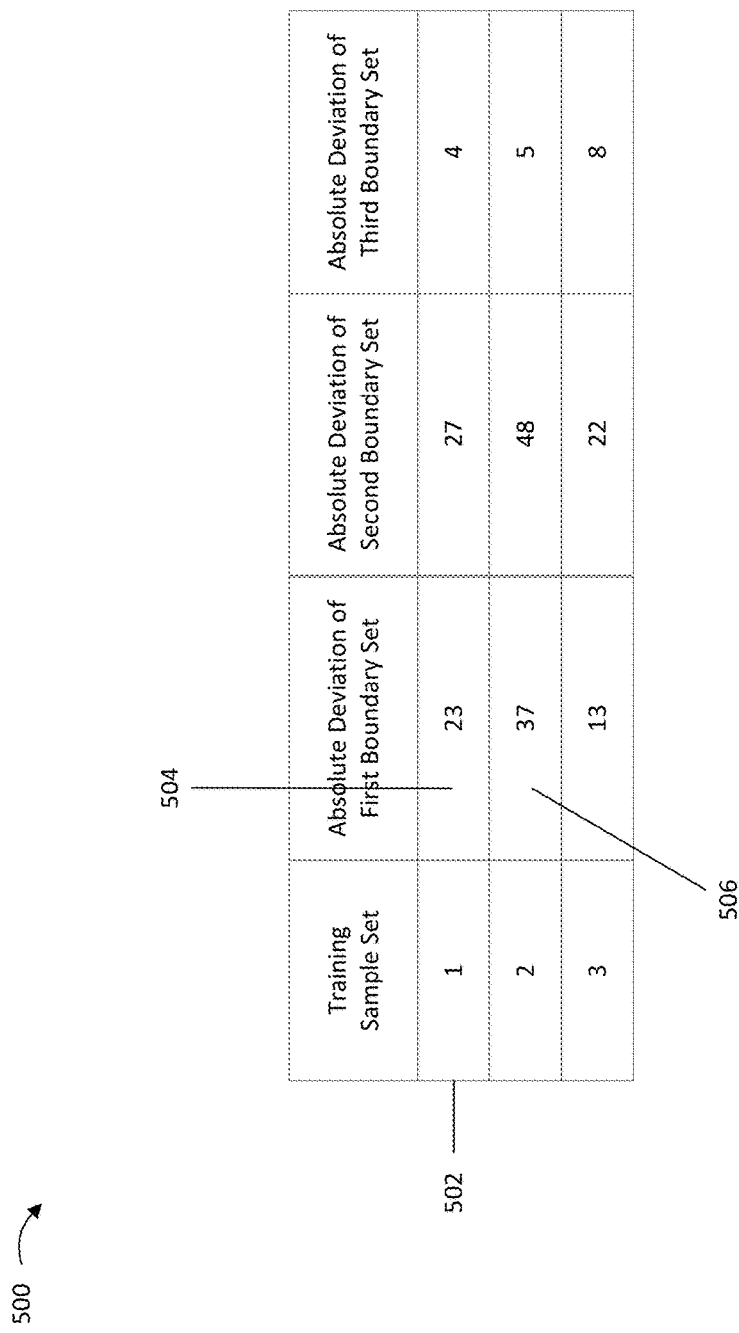
FIG. 5 is an illustration of an absolute deviation table, according to one or more embodiments.

FIG. 5 is an illustration 500 of an absolute deviation table, according to one or more embodiments. The recommender can use the values from the data range table to calculate absolute deviations for each boundary set of each training sample set. The recommender can calculate an absolute deviation for each boundary set of each training sample set. To calculate the absolute deviation, the recommender can determine an average value for the upper boundaries of each of the adjusted data ranges of the training sample sets. The recommender can then calculate an absolute deviation for each boundary set of each training sample set. The absolute deviation can be a difference between the upper boundary values of the data ranges of each training sample set and the calculated average. The recommender can then calculate a respective cumulative absolute deviation for each training sample set and rank the training sample sets based on the cumulative absolute deviation.

For example, the recommender can create an absolute deviation table 502 and populate the table with values calculated as described above. For the first training sample set, the recommender can take the upper boundary values of the adjusted data ranges for each training sample set and calculate the average value. The respective upper boundary value of first adjusted data ranges of each training sample set is 260 for the first training sample set, 200 for the second training sample set, and 250 for the third training sample set (see, for example, the data range table 412 of FIG. 4). The recommender can calculate the average value of these values as 237 (e.g., ((260+200+250)/3)=237). The respective upper boundary value of the second adjusted data ranges of each training sample set is 500 for the first training sample set, 575 for the second training sample set, and 505 for the third training sample set. The respective upper boundary value of third adjusted data ranges of each training sample set is 776 for the first training sample set, 777 for the second training sample set, and 764 for the third training sample set. The recommender can calculate respective average values of 527 and 772 for the second adjusted data range and the third adjusted data range.

The recommender can calculate the absolute deviation as the difference between the upper boundary values of each adjusted data range and the calculated median. For example, for the first adjusted data range for the first training sample set, the recommender can calculate an absolute deviation of 23 (e.g., |260−237|=23). The recommender can further populate a first cell 504 with this value. Additionally, for the first adjusted data range of the second training sample set, the recommender can calculate the absolute deviation as 37 (e.g., |200−237|=37). The recommender can further populate a second cell 506 with this value. The recommender can further make similar calculations to populate the rest of the absolute deviation table 502.

Figure 6:
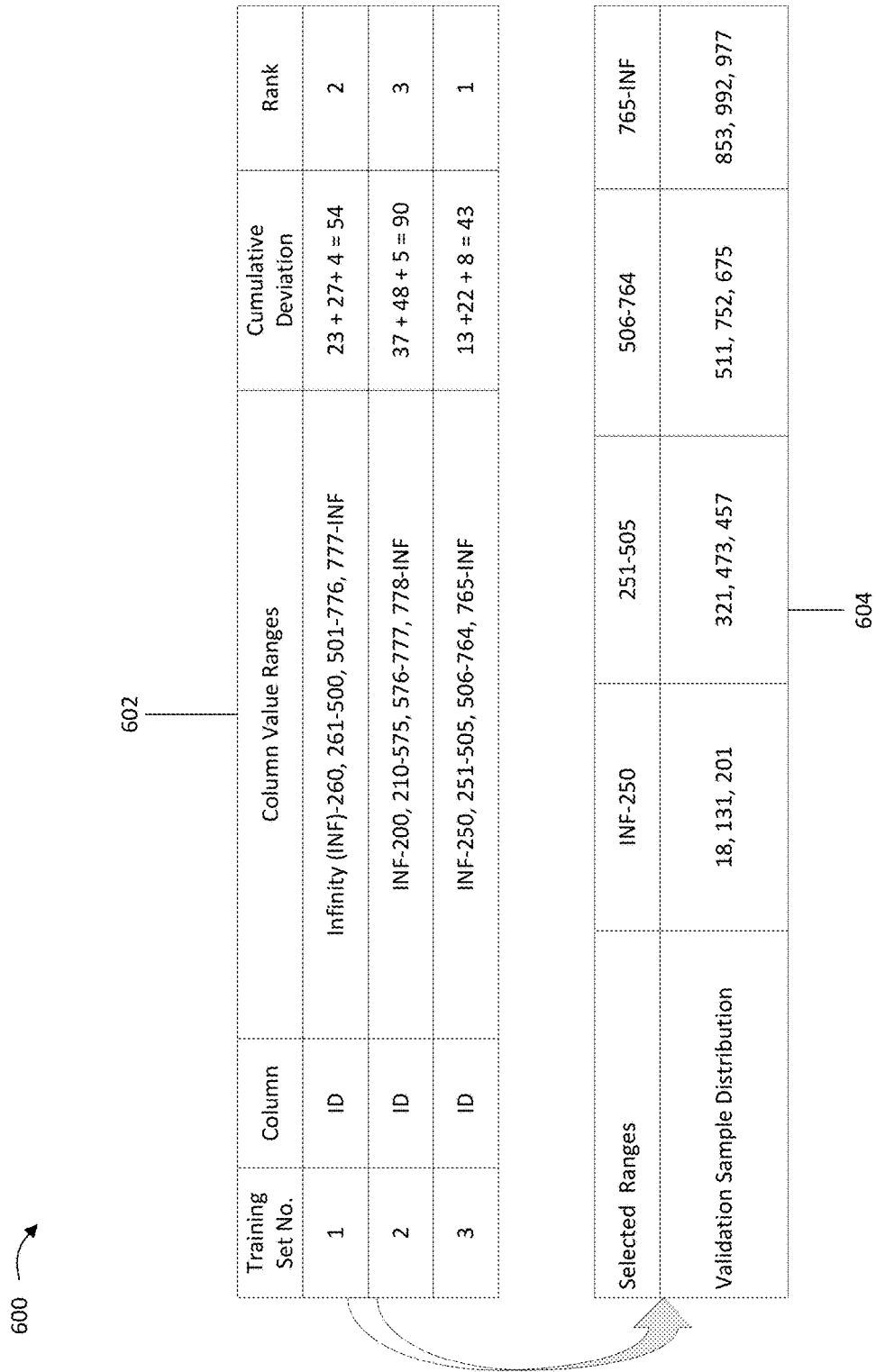
FIG. 6 is an illustration of ranking data ranges, according to one or more embodiments.

FIG. 6 is an illustration 600 of ranking data ranges, according to one or more embodiments. The recommender can further rank the adjusted data ranges based on the absolute deviation values. The rankings can be based on cumulative absolute deviations. The recommender can sum the absolute deviations for each training sample set and rank the adjusted data ranges based on the sums.

For example, the recommender can create a ranking table 602 and populate the cells with the rankings. Consider the first training sample set as illustrated in FIG. 6. The recommender can calculate the absolute deviations for each of the adjusted data ranges for a cumulative absolute deviation of 54 (e.g., 23+27+4=54). The recommender can further populate a cell 604 of the ranking table 602 with the value. The calculations have been left on FIG. 6 for illustration purposes. The recommender can make similar calculations and populate the ranking table 602 for the second training sample set and the third training sample set.

As illustrated, the first training sample set has a cumulative absolute deviation value of 54, the second training sample set has cumulative absolute deviation value of 90, and the third training sample set has a cumulative absolute deviation value of 43. The recommender can rank the training sample sets based on the least amount of deviation. As illustrated, the third training sample set has the least amount of deviation (e.g., 43) and is ranked first, the first training sample set has the second least amount of deviation (e.g., 54) and is ranked second, and the second training sample set has the third least amount of deviation (e.g., 90) and is ranked third.

The recommender can further validate the adjusted data ranges of the recommended data set using the validation sample set. The recommender can create a validation table 604 with a column for each adjusted data range of the recommended training sample set. In other instances, the recommender can create a validation histogram. The recommender can further populate the validation table 604 with values from the validation sample set to determine if there is a uniform distribution of values.

As illustrated, the recommender has created the validation table 604 and include columns for each of the adjusted data ranges of the third training sample set (e.g., infinity-250, 251-505, 506-764, and 765-infinity). The recommender has further populated the associated validation sample row values with the values from the validation sample set 308 of FIG. 3. As illustrated, the first adjusted data range of inf-250 includes the ID column values 18, 131, and 201; the second adjusted data range of 251-505 includes the ID column values 321, 473, 457; the third adjusted data range includes the ID column values 511, 52, and 675; and the fourth adjusted data range of 765-infinity includes the ID column values 853, 992, and 977. Therefore, as illustrated, each of the adjusted data ranges includes three ID column values of the validation sample set 308. As the ID columns values are uniformly distributed across the adjusted data ranges, the recommender can recommend that the data extractor partition the data stored at the source system into four partitions using the adjusted data ranges of the third training sample set. It can be presumed that if the data at the source system is partitioned using the adjusted data ranges of the third training sample set, the partitions will each include the relatively same about of data.

In practical real-life scenarios, it can be expected that the distribution is not completely uniform. One set of partitioning column values for an adjusted data range can include more values or less values than the other set of partitioning column values. For example, in one scenario, a first adjusted data range can include 700 partitioning column values for validation, a second adjusted data range can include 710 partitioning column values for validation, and a third adjusted data range includes 520 partitioning column values for validation. It can be seen that the validation process has revealed that the third adjusted range has far fewer partitioning column values than the other adjusted data ranges. Therefore, it can be expected that if the data extractor using these adjusted data ranges to partition the data at the source system one partition is considerably smaller than the other partitions.

Therefore, the recommender can further include a threshold margin (e.g., 10% or 15%) for validating a set of adjusted data ranges. If the number of partitioning column values associated with one adjusted data range is different by greater than the margin, the recommender can discard the training sample set and validate the next highest ranked training sample set.

Figure 7:
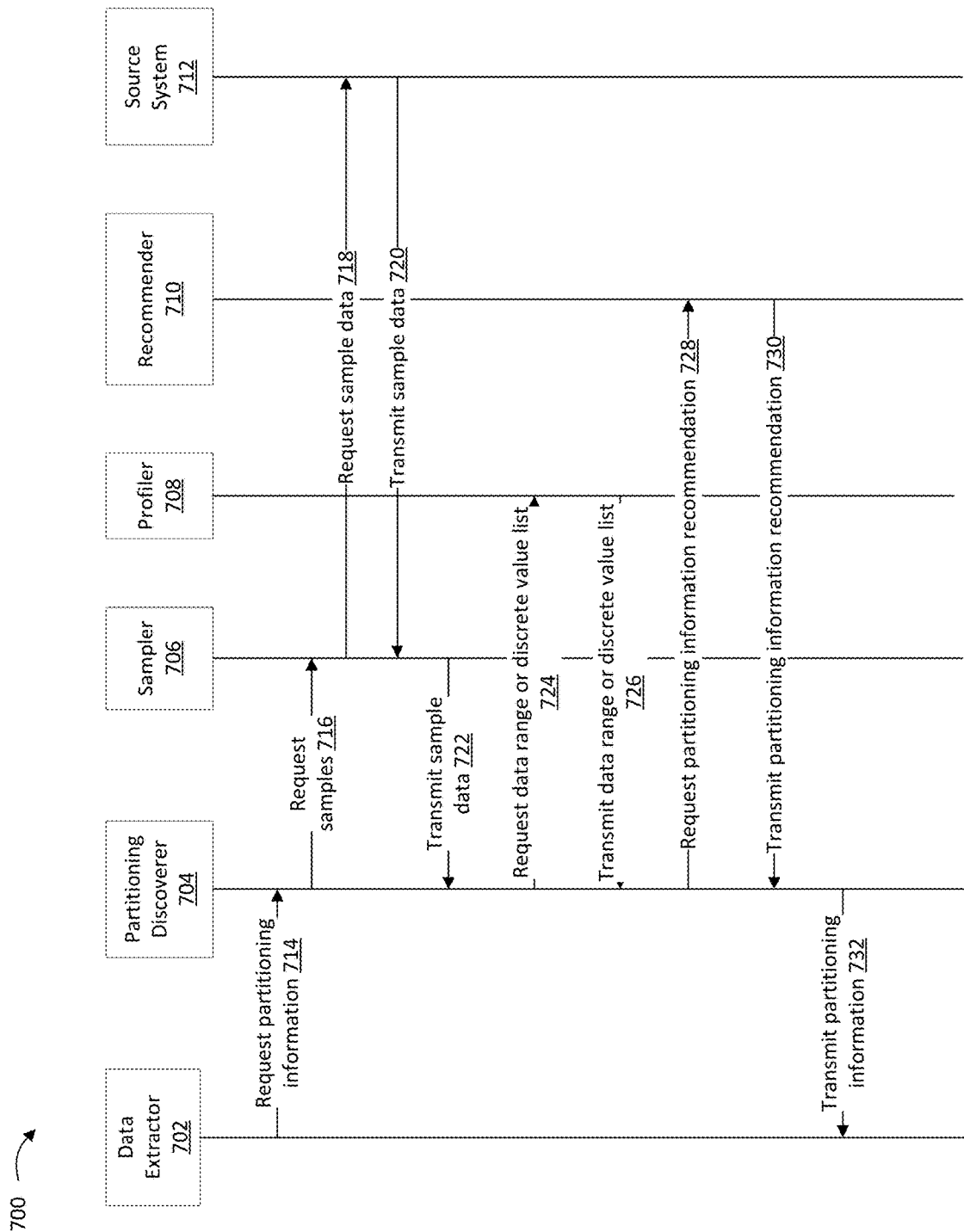
FIG. 7 is a signaling diagram for discovery of source range partitioning information, according to one or more embodiments.

FIG. 7 is a signaling diagram 700 for the discovery of source partitioning information, according to one or more embodiments. As illustrated, a data extractor 702 is in operable communication with a partitioning discoverer 704, a sampler 706, a profiler 708, a recommender 710, and a source system 712. While the operations of processes 700 and 800 are described as being performed by generic computers, any suitable device (e.g., a cloud provider server) may be used to perform one or more operations of these processes. Processes 700 and 800 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the processes.

At 714, a data extractor can transmit to the partitioning discoverer 704 a request for partitioning information. The data extractor can be tasked with extracting data from a source system to be transmitted to a target system. The data can have a size such that transmitting the data is more efficient if the data were partitioned at the source system, transmitted in partitions, and reassembled at the target system.

At 716, the partitioning discoverer can transmit a request to the sampler 706 for training sample sets and validation sample sets. The request can include an identity of a source system and data to be sampled.

At 718, the sampler 706 can transmit a request to the source system 712 for training sample sets and validation sample sets. In most instances, the sampler 706 can make requests for sampling, and the source system 712 can perform the sampling. In some instances, the sampler can perform the sampling function at the source system 712. In some instances, the sampler 706 can create different groups of the training sample sets and the validation sample sets.

At 720, the sampled data can be transmitted from the source system 712 to the sampler 706. At 722, the sampler 706 can transmit the sampled data to the partitioning discoverer 704.

At 724, the partitioning discoverer 704 can transmit a request for a data range to the profiler 708. The request can include the sampled data received from the sampler 706. In response to receiving the request, the profiler 708 can select a partitioning column and create buckets of values for the training sample set. In the instance that the partitioning column values are numerical values, the profiler can arrange the values in each training sample set in ascending or descending order. The profiler can further divide the partitioning column values for each training sample set into buckets. For each group of training sample sets, the profiler 708 can divide the partitioning column values into a respective same number of buckets. For example, the profiler 708 can divide the partitioning column values for one group of training sample sets into four buckets for each training sample set in the group and another group of training sample sets into five buckets for each training sample set in the group. The profiler can further adjust the data ranges of each of the buckets, such that the upper boundary values of one bucket and the lower boundary values of another bucket are extended to a value between the buckets. The profiler can further create a table indicating the adjusted data ranges for each bucket of each training sample set from a lower boundary value to an upper boundary value.

At 726, the profiler can transmit the list of data ranges to the partitioning discoverer. The list can include the table, or some other data structure, created by the profiler 708 that include the group of training sample sets with the adjusted data ranges.

At 728, partitioning discoverer 704 can transmit a request for partitioning information recommendation from the recommender 710. The request can include the list of data ranges received from the profiler 708. For each group of training sample sets and validation sample sets, the recommender 710 can calculate an absolute deviation value for each of the adjusted data ranges from each training sample set. The recommender 710 can further calculate a cumulative absolute deviation value for each training sample set and rank the training sample sets based on the absolute cumulative deviation values.

The recommender 710 can then validate the highest ranked training sample set using the validation sample set. The validation can be based on whether distributing the values of the validation sample set across the adjusted data ranges of the highest ranked training sample set results in an even distribution of values.

It can be contemplated that values of the validation sample set will not result in an exactly even number of values that are distributed into the adjusted data ranges. Therefore, the recommender can be configured with a threshold margin. The threshold margin can be a fixed number of values or a percentage of values. The recommender 710 can evaluate whether the number of validation sample set values in one adjusted data range is greater than the threshold margin of the number of validation sample set values of another adjusted data range. If no adjusted data range includes a threshold margin of values greater than any other adjusted data range, the recommender 710 can transmit the partitioning information to the data extractor 702 at 732. The partitioning information can include the adjusted data ranges for partitioning data at the source system. The data extractor 702 can use the partitioning information to partition the data at the source system and transmit the partitions to a data transformer.

If, however, the one adjusted data range includes a threshold margin of values greater than any other adjusted data range, the recommender 710 can select the second highest ranked training sample set and validate the second highest ranked training sample set. This process can continue until the recommender 710 can validate that the adjusted data ranges of a training sample set have an even distribution of validation sample set values. If the recommender 710 exhausts all of the received adjusted data ranges, the recommender 710 can send a message to the partitioning discoverer 704 to request a new partitioning information that includes a new group of adjust data ranges.

Figure 8:
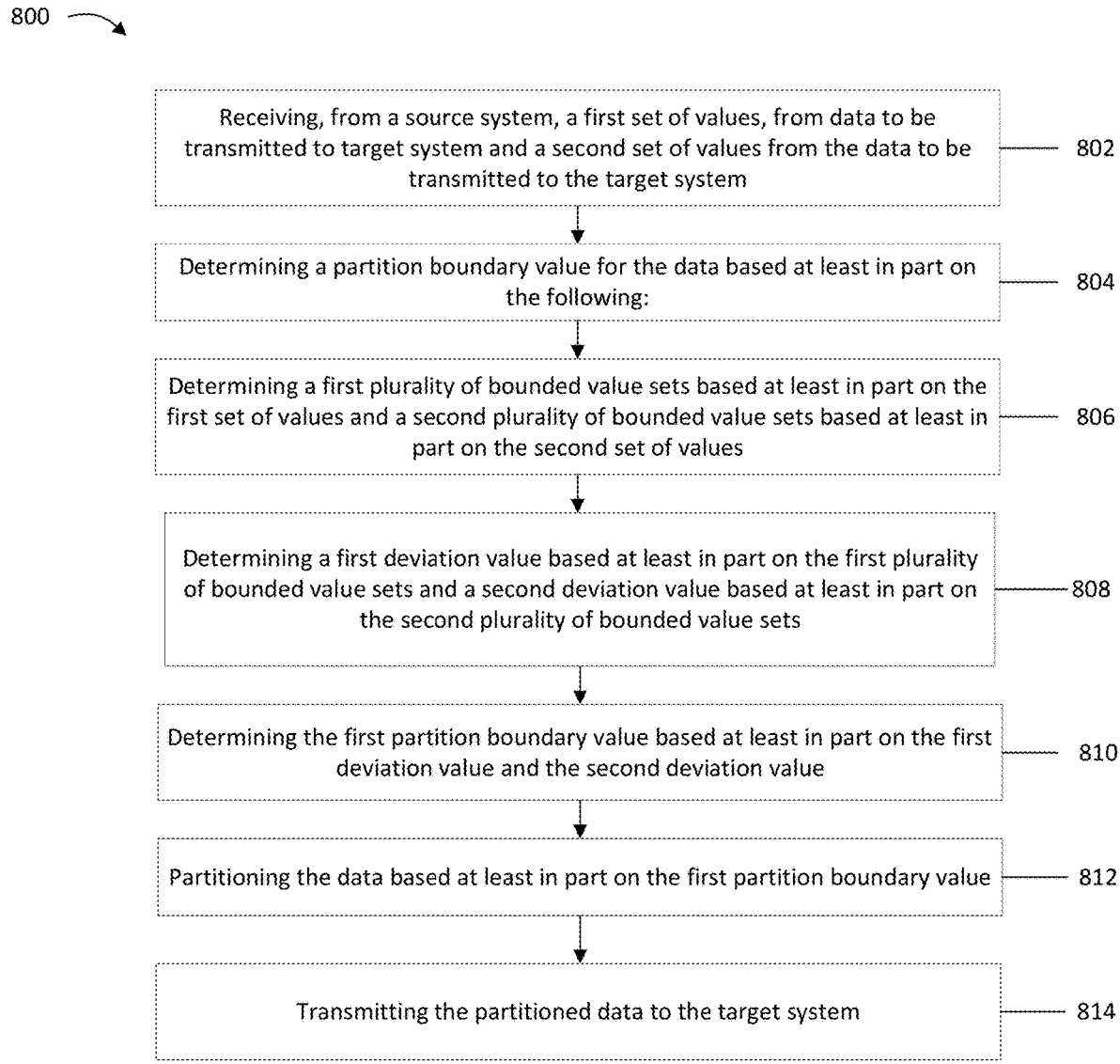
FIG. 8 is a process flow for discovery of source range partitioning information, according to one or more embodiments

FIG. 8 is a process flow 800 for discovery of source range partitioning information, according to one or more embodiments. At 802, the method can include a computing device receiving, from a source system, a first set of values from data to be transmitted to a target system and a second set of values from the data to be transmitted to the target system. The computing device can be a computing device, such as a server, of a data integration service. The data to be transmitted can be large enough such that the data integration service can elect to partition the data for transmitting to the target system.

At 804, the method can include a computing device determining a partition boundary value for the data based at least in part on the steps 806-16.

At 806, the method can include a computing device determining a first plurality of bounded value sets based at least in part on the first set of values and a second plurality of bounded value sets based at least in part on the second set of values. The first plurality of boundary value sets can be a set values with adjusted boundary values. For example, referring back to FIG. 4, the first plurality of bounded value sets can include a first bounded value set of infinity to 260. The second plurality of bounded values can include a second bounded value set of inf-200. The first plurality of bounded value sets can further include a third bounded value set of 261-500. The second plurality of bounded value sets can further include a fourth bounded value set of 201-575.

At 808, the method can include a computing device determining a first deviation value based at least in part on the first set of values and a second deviation value based at least in part on the second set of values.

In some embodiments, determining the first deviation value and the second deviation value can include the computing device determining a first average value of a first value of a first bounded value set of the first plurality of bounded value sets and a second value of a third bounded value set of the second plurality of bounded value sets, the first value corresponding to a first candidate partition boundary value. For example, the first average value can be calculated based on an upper boundary value (e.g., first value) of the first bounded value set, 260, and an upper boundary value of the third bounded value set, 200 (e.g., (260+200)/2=230=first average value).

The computing device can determine a second average value of a third value of a third set of bounded values of the first plurality of bounded value sets and a fourth value of a fourth set bounded values of the second plurality of bounded values, the third value corresponding to a second candidate partition boundary value. For example, referring back to FIG. 4, the second average value can be calculated based on an upper boundary value (e.g., third value) of the third bounded value set, 500, and an upper boundary value of the fourth bounded value set, 575 (e.g., (500+570)/2=535=second average value).

The computing device can determine the first deviation value of the first average value from the first value. The first deviation value can be an absolute deviation value. Using the figures from the steps above, the computing device can calculate an absolute value of a difference between the upper boundary value of the first bounded value set, 260 and the first average value, 230 (e.g., |260−230|=30).

The computing device can determine the second deviation value of the second average value from the third value. Using the figures from the steps above second deviation value can be calculated as an absolute value of a difference between the upper boundary value of the third bounded value set, 200 and the first average value, 230 (e.g., |200−230|=30).

At 810, the method can include a computing device determining the first partition boundary value based at least in part on the first deviation value and the second deviation value, the first partition boundary value can be the first candidate boundary value or the second candidate partition boundary value. The computing device can further calculate a respective cumulative deviation value for the first plurality of boundary value sets. For example, the computing device can calculate an absolute value of a difference between the upper boundary value of the second bounded value set, 500 and the second average value, 535 (e.g., |500−535|=35). the computing device can calculate an absolute value of a difference between the upper boundary value of the fourth bounded value set, 575 and the second average value, 535 (e.g., |575−535|=40). The computing device can further calculate a first cumulative absolute deviation for the first plurality of boundary value sets (e.g., 30+35=65). The computing device can further calculate a first cumulative absolute deviation for the second plurality of boundary value sets (e.g., 30+40=70). The determination can be based on the least amount of deviation, which in this example, is the first plurality of boundary sets (e.g., 65<70).

At 812, the method can include the computing device partitioning the data based at least in part on the first partition boundary value. For example, referring back to FIGS. 3 and 4, if the computing device determined to partition the data based on the third training sample set, the computing device can create a first partition of ID column rows 1-250 (including values for the name, DoJ, Role, Phone, address and designation columns), a second partition of ID column rows 251-505, a third partition of rows 506-764, and a fourth partition of rows 765-1000.

At 814, the method can include the computing device transmitting the partitioned data to the target system.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 9:
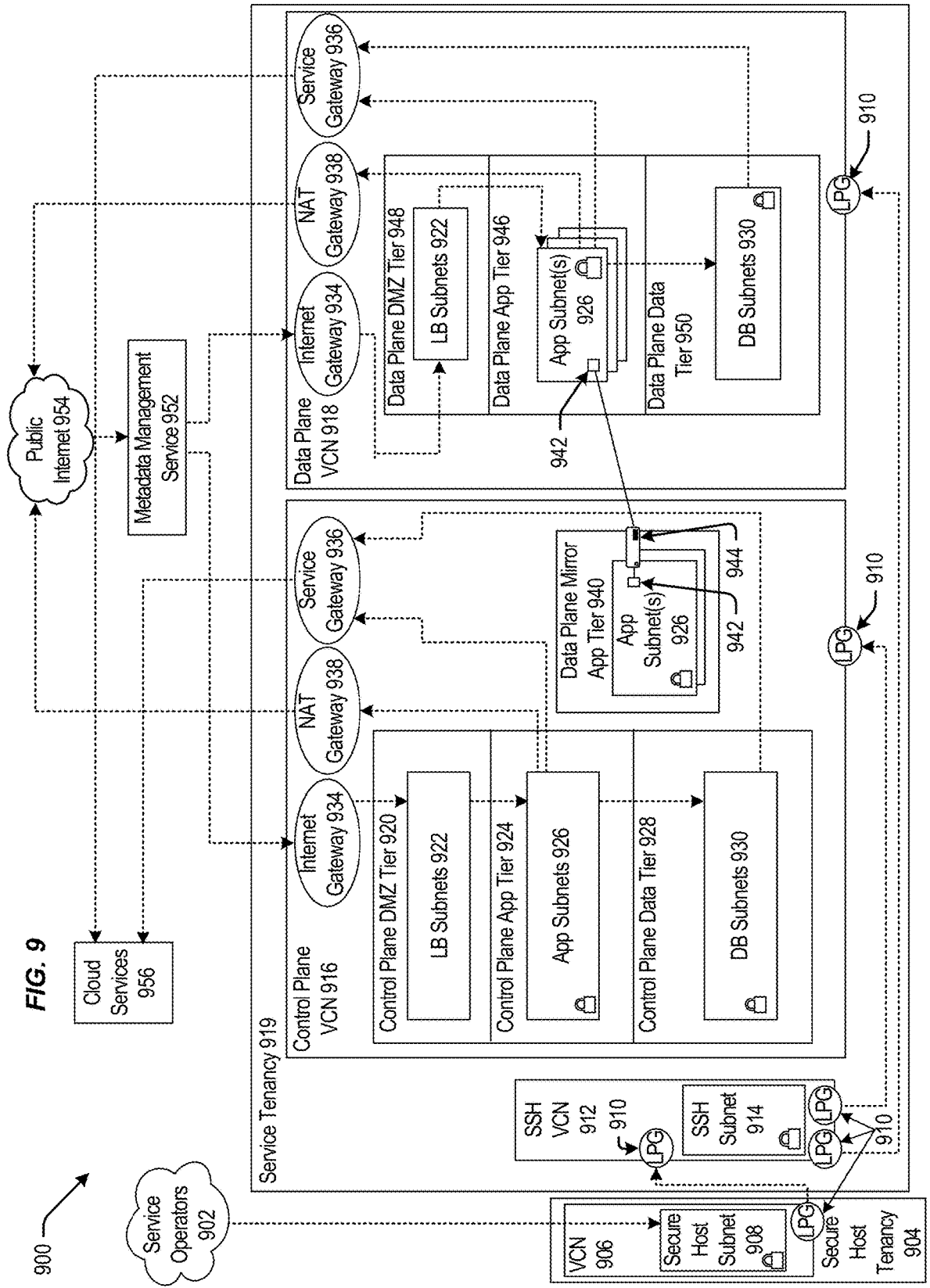
FIG. 9 is a block diagram illustrating one pattern for implementing a cloud infrastructure as a service system, according to at least one embodiment.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively couple to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Metadata that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of threat prevention, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

Figure 10:
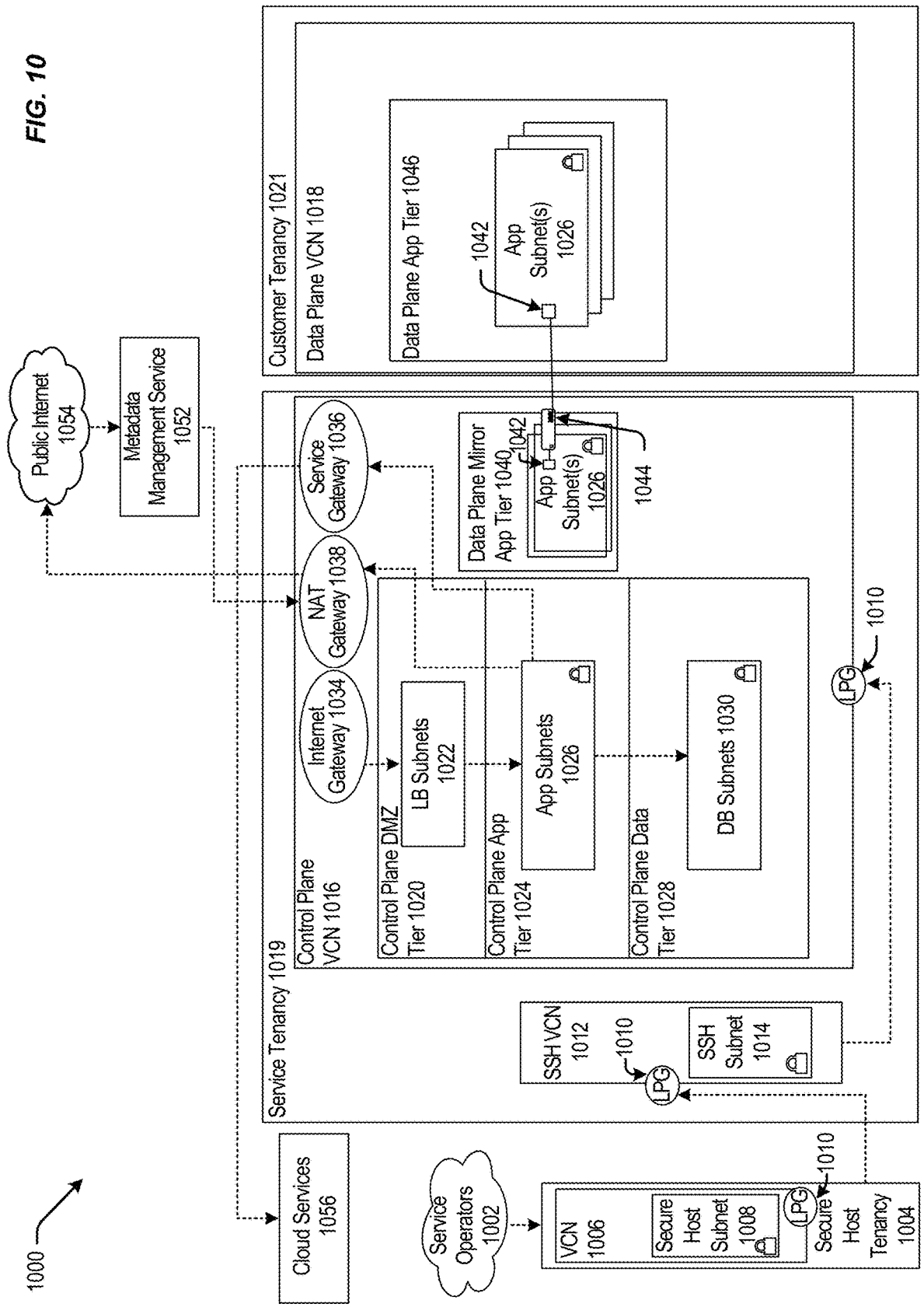
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 902 of FIG. 9) can be communicatively coupled to a secure host tenancy 1004 (e.g., the secure host tenancy 904 of FIG. 9) that can include a virtual cloud network (VCN) 1006 (e.g., the VCN 906 of FIG. 9) and a secure host subnet 1008 (e.g., the secure host subnet 908 of FIG. 9). The VCN 1006 can include a local peering gateway (LPG) 1010 (e.g., the LPG 910 of FIG. 9) that can be communicatively coupled to a secure shell (SSH) VCN 1012 (e.g., the SSH VCN 912 of FIG. 9) via an LPG 910 contained in the SSH VCN 1012. The SSH VCN 1012 can include an SSH subnet 1014 (e.g., the SSH subnet 914 of FIG. 9), and the SSH VCN 1012 can be communicatively coupled to a control plane VCN 1016 (e.g., the control plane VCN 916 of FIG. 9) via an LPG 1010 contained in the control plane VCN 1016. The control plane VCN 1016 can be contained in a service tenancy 1019 (e.g., the service tenancy 919 of FIG. 9), and the data plane VCN 1018 (e.g., the data plane VCN 918 of FIG. 9) can be contained in a customer tenancy 1021 that may be owned or operated by users, or customers, of the system.

The control plane VCN 1016 can include a control plane DMZ tier 1020 (e.g., the control plane DMZ tier 920 of FIG. 9) that can include LB subnet(s) 1022 (e.g., LB subnet(s) 922 of FIG. 9), a control plane app tier 1024 (e.g., the control plane app tier 924 of FIG. 9) that can include app subnet(s) 1026 (e.g., app subnet(s) 926 of FIG. 9), a control plane data tier 1028 (e.g., the control plane data tier 928 of FIG. 9) that can include database (DB) subnet(s) 1030 (e.g., similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g., the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g., the service gateway 936 of FIG. 9) and a network address translation (NAT) gateway 1038 (e.g., the NAT gateway 938 of FIG. 9). The control plane VCN 1016 can include the service gateway 1036 and the NAT gateway 1038.

The control plane VCN 1016 can include a data plane mirror app tier 1040 (e.g., the data plane mirror app tier 940 of FIG. 9) that can include app subnet(s) 1026. The app subnet(s) 1026 contained in the data plane mirror app tier 1040 can include a virtual network interface controller (VNIC) 1042 (e.g., the VNIC of 942) that can execute a compute instance 1044 (e.g., similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g., the data plane app tier 946 of FIG. 9) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g., the metadata management service 952 of FIG. 9) that can be communicatively coupled to public Internet 1054 (e.g., public Internet 954 of FIG. 9). Public Internet 1054 can be communicatively coupled to the NAT gateway 1038 contained in the control plane VCN 1016. The service gateway 1036 contained in the control plane VCN 1016 can be communicatively couple to cloud services 1056 (e.g., cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources, that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment 9," may be located in Region 1 and in "Region 2." If a call to Deployment 9 is made by the service gateway 1036 contained in the control plane VCN 1016 located in Region 1, the call may be transmitted to Deployment 9 in Region 1. In this example, the control plane VCN 1016, or Deployment 9 in Region 1, may not be communicatively coupled to, or otherwise in communication with, Deployment 9 in Region 2.

Figure 11:
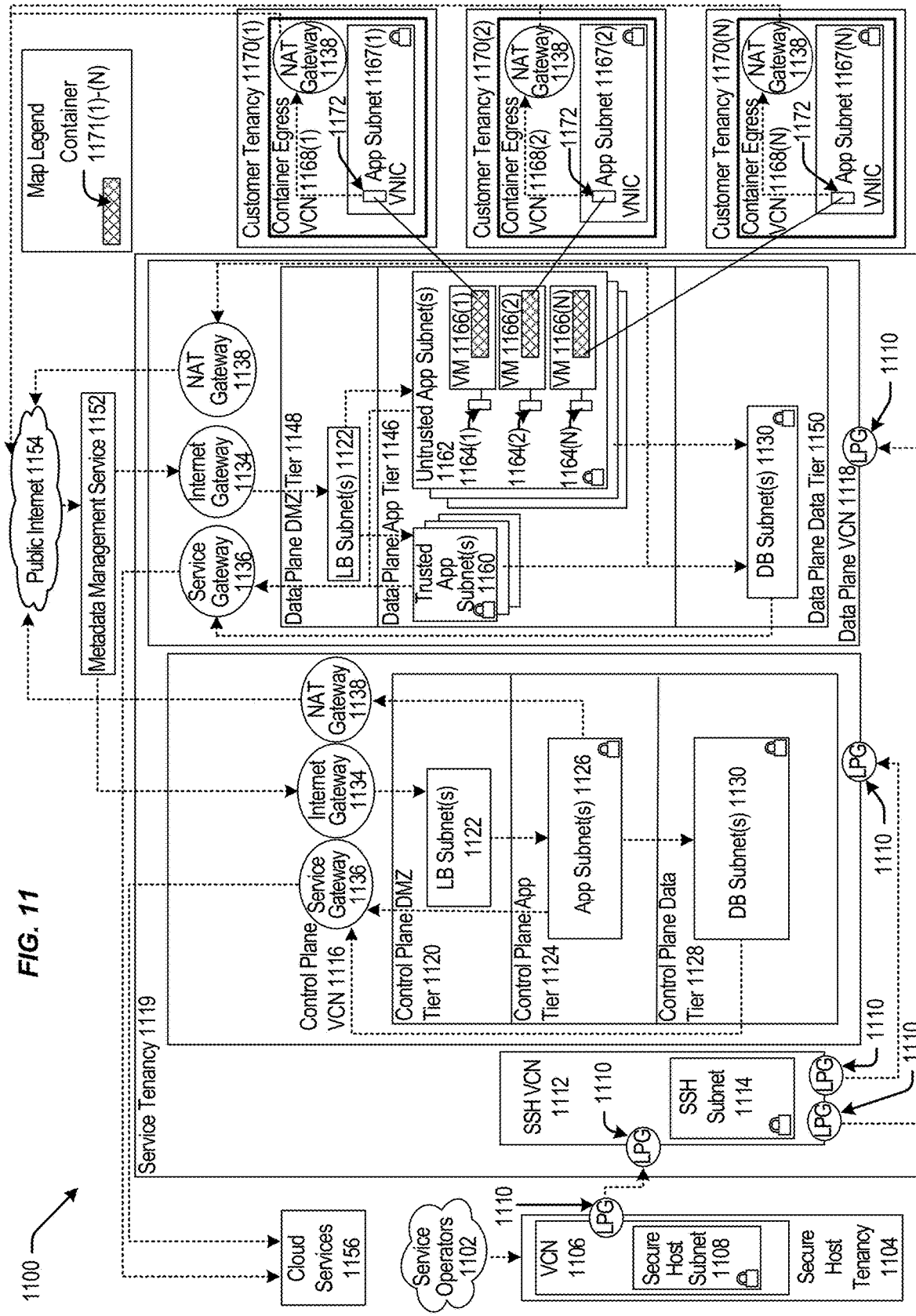
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 902 of FIG. 9) can be communicatively coupled to a secure host tenancy 1104 (e.g., the secure host tenancy 904 of FIG. 9) that can include a virtual cloud network (VCN) 1106 (e.g., the VCN 906 of FIG. 9) and a secure host subnet 1108 (e.g., the secure host subnet 908 of FIG. 9). The VCN 1106 can include an LPG 1110 (e.g., the LPG 910 of FIG. 9) that can be communicatively coupled to an SSH VCN 1112

(e.g., the SSH VCN 912 of FIG. 9) via an LPG 1110 contained in the SSH VCN 1112. The SSH VCN 1112 can include an SSH subnet 1114 (e.g., the SSH subnet 914 of FIG. 9), and the SSH VCN 1112 can be communicatively coupled to a control plane VCN 1116 (e.g., the control plane VCN 916 of FIG. 9) via an LPG 1110 contained in the control plane VCN 1116 and to a data plane VCN 1118 (e.g., the data plane 918 of FIG. 9) via an LPG 1110 contained in the data plane VCN 1118. The control plane VCN 1116 and the data plane VCN 1118 can be contained in a service tenancy 1119 (e.g., the service tenancy 919 of FIG. 9).

The control plane VCN 1116 can include a control plane DMZ tier 1120 (e.g., the control plane DMZ tier 920 of FIG. 9) that can include load balancer (LB) subnet(s) 1122 (e.g., LB subnet(s) 922 of FIG. 9), a control plane app tier 1124 (e.g., the control plane app tier 924 of FIG. 9) that can include app subnet(s) 1126 (e.g., similar to app subnet(s) 926 of FIG. 9), a control plane data tier 1128 (e.g., the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 9) and a network address translation (NAT) gateway 1138 (e.g., the NAT gateway 938 of FIG. 9). The control plane VCN 1116 can include the service gateway 1136 and the NAT gateway 1138.

The data plane VCN 1118 can include a data plane app tier 1146 (e.g., the data plane app tier 946 of FIG. 9), a data plane DMZ tier 1148 (e.g., the data plane DMZ tier 948 of FIG. 9), and a data plane data tier 1150 (e.g., the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g., public Internet 954 of FIG. 9).

The Internet gateway 1134 contained in the control plane VCN 1116 and contained in the data plane VCN 1118 can be communicatively coupled to a metadata management service 1152 (e.g., the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171(1)-(N) may be communicatively coupled to the customer tenancy 1170 and may be configured to transmit or receive data from the customer tenancy 1170. The containers 1171(1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

Figure 12:
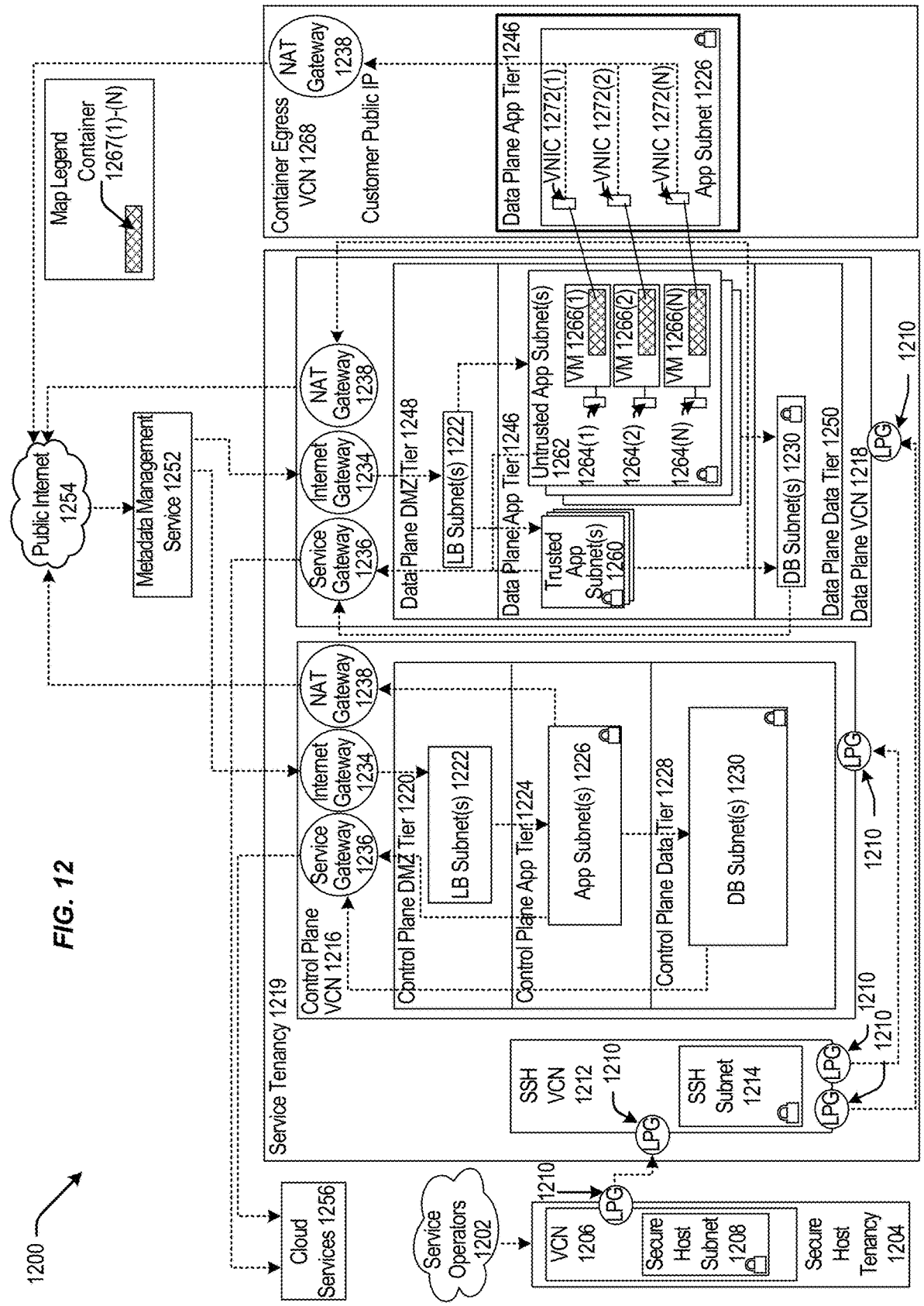
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 902 of FIG. 9) can be communicatively coupled to a secure host tenancy 1204 (e.g., the secure host tenancy 904 of FIG. 9) that can include a virtual cloud network (VCN) 1206 (e.g., the VCN 906 of FIG. 9) and a secure host subnet 1208 (e.g., the secure host subnet 908 of FIG. 9). The VCN 1206 can include an LPG 1210 (e.g., the LPG 910 of FIG. 9) that can be communicatively coupled to an SSH VCN 1212 (e.g., the SSH VCN 912 of FIG. 9) via an LPG 1210 contained in the SSH VCN 1212. The SSH VCN 1212 can include an SSH subnet 1214 (e.g., the SSH subnet 914 of FIG. 9), and the SSH VCN 1212 can be communicatively coupled to a control plane VCN 1216 (e.g., the control plane VCN 916 of FIG. 9) via an LPG 1210 contained in the control plane VCN 1216 and to a data plane VCN 1218 (e.g., the data plane 918 of FIG. 9) via an LPG 1210 contained in the data plane VCN 1218. The control plane VCN 1216 and the data plane VCN 1218 can be contained in a service tenancy 1219 (e.g., the service tenancy 919 of FIG. 9).

The control plane VCN 1216 can include a control plane DMZ tier 1220 (e.g., the control plane DMZ tier 920 of FIG. 9) that can include LB subnet(s) 1222 (e.g., LB subnet(s) 922 of FIG. 9), a control plane app tier 1224 (e.g., the control plane app tier 924 of FIG. 9) that can include app subnet(s) 1226 (e.g., app subnet(s) 926 of FIG. 9), a control plane data tier 1228 (e.g., the control plane data tier 928 of FIG. 9) that can include DB subnet(s) 1230 (e.g., DB subnet(s) 1130 of FIG. 11). The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g., the service gateway of FIG. 9) and a network address translation (NAT) gateway 1238 (e.g., the NAT gateway 938 of FIG. 9). The control plane VCN 1216 can include the service gateway 1236 and the NAT gateway 1238.

The data plane VCN 1218 can include a data plane app tier 1246 (e.g., the data plane app tier 946 of FIG. 9), a data plane DMZ tier 1248 (e.g., the data plane DMZ tier 948 of FIG. 9), and a data plane data tier 1250 (e.g., the data plane data tier 950 of FIG. 9). The data plane DMZ tier 1248 can include LB subnet(s) 1222 that can be communicatively coupled to trusted app subnet(s) 1260 (e.g., trusted app subnet(s) 1160 of FIG. 11) and untrusted app subnet(s) 1262 (e.g., untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N), and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g., public Internet 954 of FIG. 9).

The Internet gateway 1234 contained in the control plane VCN 1216 and contained in the data plane VCN 1218 can be communicatively coupled to a metadata management service 1252 (e.g., the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 13:
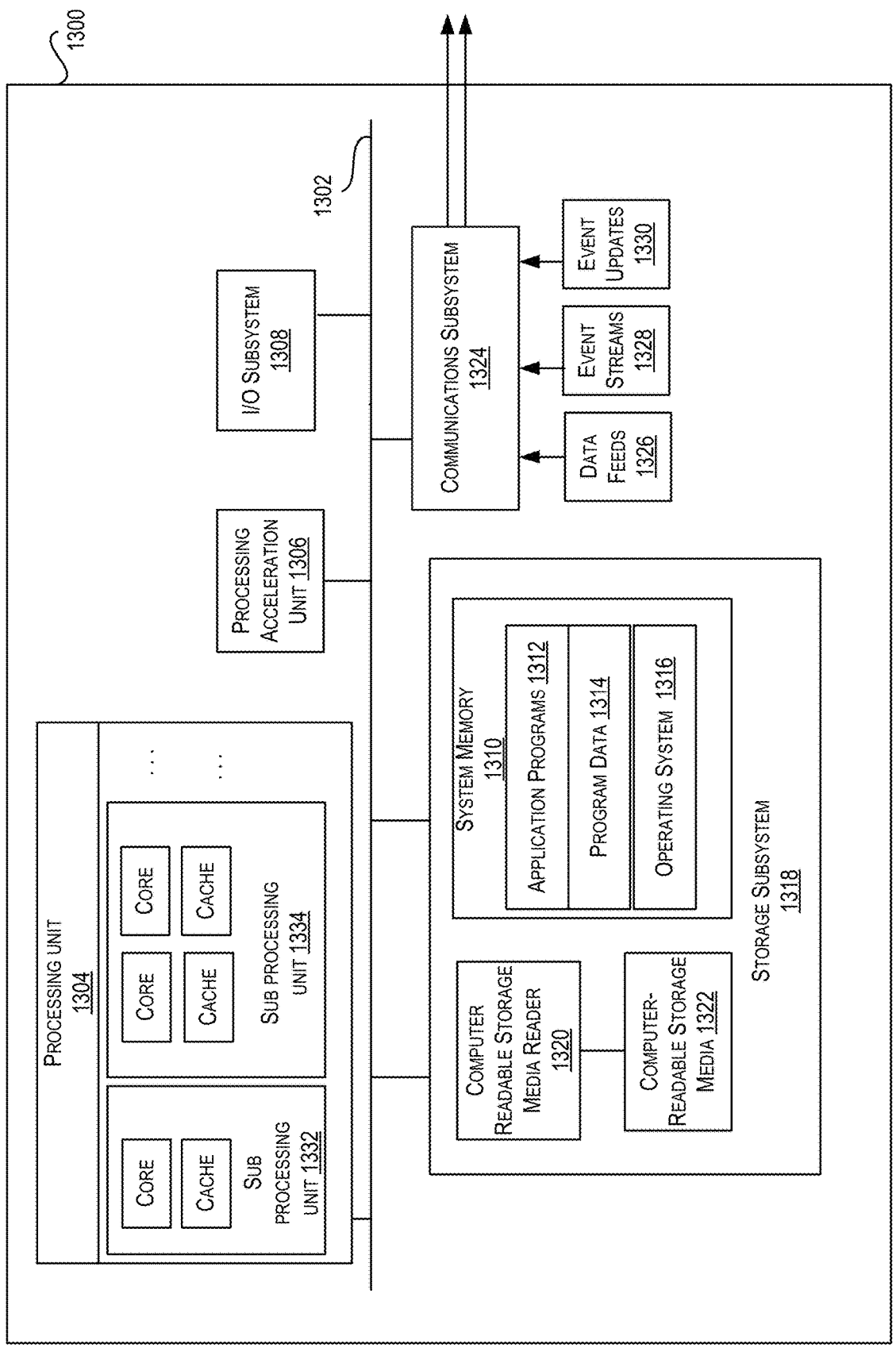
FIG. 13 is a block diagram illustrating an example computer system, according to at least one embodiment.

FIG. 13 illustrates an example computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program services that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1318 may also provide a tangible computer-readable storage medium for storing the basic programming and data constructs that provide the functionality of some embodiments. Software (programs, code services, instructions) that when executed by a processor provide the functionality described above may be stored in storage subsystem 1318. These software services or instructions may be executed by processing unit 1304. Storage subsystem 1318 may also provide a repository for storing data used in accordance with the present disclosure.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving, by a computing device and from a source system, a first set of values from data to be transmitted to a target system and a second set of values from the data to be transmitted to the target system;
   determining, by the computing device, a partition boundary value for the data based at least in part on:
      determining, by the computing device, a first plurality of bounded value sets based at least in part on the first set of values and a second plurality of bounded value sets based at least in part on the second set of values;
      determining, by the computing device, a first deviation value based at least in part on a first upper boundary value of the first plurality of bounded value sets and a first value of the second plurality of bounded value sets;
      determining, by the computing device, a second deviation value based at least in part on a second upper boundary value of the second plurality of bounded value sets and a second value of the first plurality of bounded value sets; and
      determining, by the computing device, a first partition boundary value based at least in part on the first deviation value and the second deviation value;
   partitioning, by the computing device, the data based at least in part on the first partition boundary value; and transmitting, by the computing device, the partitioned data to the target system.

2. The method of claim 1, wherein determining a first deviation value based at least in part on the first plurality of bounded value sets and a second deviation value based at least in part on the second plurality of bounded value sets comprises:
  determining a first average value of a first value of a first bounded value set of the first plurality of bounded value sets and a second value of a second bounded value set of the second plurality of bounded value sets, the first value corresponding to a first candidate partition boundary value;
  determining a second average value of a third value of a third set of bounded values of the first plurality of bounded value sets and a fourth value of a fourth set bounded values of the second plurality of bounded values, the third value corresponding to a second candidate partition boundary value;
  determining the first deviation value of the first average value from the first value; and
  determining the second deviation value of the second average value from the third value.

3. The method of claim 2, wherein the method further comprises:
  receiving a third set of values from the data to be transmitted to the target system;
  determining whether the values of the third set of values are uniformly distributed across a first partition generated using the first partition boundary value and across a second partition generated using the second partition boundary value; and
  determining whether to partition the data using the first candidate partition boundary value or the second candidate partition boundary value based at least in part on the determination of uniform distribution.

4. The method of claim 3, wherein determining whether the values of the third set of values are uniformly distributed across the first partition and across the second partition is based at least in part on determining a first number of values distributed across the first partition is greater by a threshold margin than a second number of values distributed across the second partition.

5. The method of claim 4, wherein comparing the first deviation value to the second deviation value comprises determining whether the first deviation value is greater than the second deviation value.

6. The method of claim 2, wherein the method further comprises:
  determining a difference between the first average value and the first value;
  determining an absolute value of the difference of the first average value and the first value, wherein the first deviation value is the absolute value;
  determining a difference between the second average value and the third value; and
  determining an absolute value of the difference of the second average value and the third value, wherein the second deviation value is the absolute value.

7. The method of claim 1, wherein the method further comprises:
  identifying a fifth value of the first set of values and a sixth value of the second set of values;
  determining a midpoint of the fifth value and the sixth value; and
  determining the first plurality of bounded value sets and the second plurality of bounded value sets based at least in part on the midpoint, wherein the first plurality of bounded values is determined by adjusting the fifth value based at least in part on the midpoint, and wherein the second plurality of bounded values is determined by adjusting the sixth value based at least in part on the midpoint.

8. A computing device, comprising:
a processor; and
a non-transitory computer-readable medium including instructions that, when executed by the processor, cause the processor to perform operations comprising:
receiving, from a source system, a first set of values from data to be transmitted to a target system and a second set of values from the data to be transmitted to the target system;
determining a partition boundary value for the data based at least in part on:
  determining a first plurality of bounded value sets based at least in part on the first set of values and a second plurality of bounded value sets based at least in part on the second set of values;
  determining a first deviation value based at least in part on a first upper boundary value of the first plurality of bounded value sets and a first value of the second plurality of bounded value sets;
  determining a second deviation value based at least in part on a second upper boundary value of the second plurality of bounded value sets and a second value of the first plurality of bounded value sets; and
  determining a first partition boundary value based at least in part on the first deviation value and the second deviation value;
partitioning the data based at least in part on the first partition boundary value; and
transmitting the partitioned data to the target system.

9. The computing device of claim 8, wherein determining a first deviation value based at least in part on the first plurality of bounded value sets and a second deviation value based at least in part on the second plurality of bounded value sets comprises:
  determining a first average value of a first value of a first bounded value set of the first plurality of bounded value sets and a second value of a second bounded value set of the second plurality of bounded value sets, the first value corresponding to a first candidate partition boundary value;
  determining a second average value of a third value of a third set of bounded values of the first plurality of bounded value sets and a fourth value of a fourth set bounded values of the second plurality of bounded values, the third value corresponding to a second candidate partition boundary value;
  determining the first deviation value of the first average value from the first value; and
  determining the second deviation value of the second average value from the third value.

10. The computing device of claim 9, wherein the instructions that, when executed by the processor, further cause the processor to perform operations comprising:
  receiving a third set of values from the data to be transmitted to the target system;
  determining whether the values of the third set of values are uniformly distributed across a first partition generated using the first partition boundary value and across a second partition generated using the second partition boundary value; and determining whether to partition the data using the first candidate partition boundary value or the second candidate partition boundary value based at least in part on the determination of uniform distribution.

11. The computing device of claim 10, wherein determining whether the values of the third set of values are uniformly distributed across the first partition and across the second partition is based at least in part on determining a first number of values distributed across the first partition is greater by a threshold margin than a second number of values distributed across the second partition.

12. The computing device of claim 9, wherein the instructions that, when executed by the processor, further cause the processor to perform operations comprising:
   determining a difference between the of the first average value and the first value;
   determining an absolute value of the difference of the first average value and the first value, wherein the first deviation value is the absolute value;
   determining a difference between the second average value and the third value; and
   determining an absolute value of the difference of the second average value and the third value, wherein the second deviation value is the absolute value.

13. The computing device of claim 8, wherein the instructions that, when executed by the processor, further cause the processor to perform operations comprising:
   identifying a fifth value of the first set of values and a sixth value of the second set of values;
   determining a midpoint of the fifth value and the sixth value; and
   determining the first plurality of bounded value sets and the second plurality of bounded value sets based at least in part on the midpoint, wherein the first plurality of bounded values is determined by adjusting the fifth value based at least in part on the midpoint, and wherein the second plurality of bounded values is determined by adjusting the sixth value based at least in part on the midpoint.

14. The computing device of claim 13, wherein comparing the first deviation value to the second deviation value comprises determining whether the first deviation value is greater than the second deviation value.

15. A non-transitory computer-readable medium having stored thereon a sequence of instructions that, when executed by a processor, causes the processor to perform operations comprising:
   receiving, from a source system, a first set of values from data to be transmitted to a target system and a second set of values from the data to be transmitted to the target system;
   determining a partition boundary value for the data based at least in part on:
      determining a first plurality of bounded value sets based at least in part on the first set of values and a second plurality of bounded value sets based at least in part on the second set of values;
      determining a first deviation value based at least in part on a first upper boundary value of the first plurality of bounded value sets and a first value of the second plurality of bounded value sets;
      determining a second deviation value based at least in part on a second upper boundary value of the second plurality of bounded value sets and a second value of the first plurality of bounded value sets; and
      determining a first partition boundary value based at least in part on the first deviation value and the second deviation value;
   partitioning the data based at least in part on the first partition boundary value; and
   transmitting the partitioned data to the target system.

16. The non-transitory computer-readable medium of claim 15, wherein determining a first deviation value based at least in part on the first plurality of bounded value sets and a second deviation value based at least in part on the second plurality of bounded value sets comprises:
   determining a first average value of a first value of a first bounded value set of the first plurality of bounded value sets and a second value of a second bounded value set of the second plurality of bounded value sets, the first value corresponding to a first candidate partition boundary value;
   determining a second average value of a third value of a third set of bounded values of the first plurality of bounded value sets and a fourth value of a fourth set bounded values of the second plurality of bounded values, the third value corresponding to a second candidate partition boundary value;
   determining the first deviation value of the first average value from the first value; and
   determining the second deviation value of the second average value from the third value.

17. The non-transitory computer-readable medium of claim 16, wherein the instructions that, when executed by the processor, further cause the processor to perform operations comprising:
   receiving a third set of values from the data to be transmitted to the target system;
   determining whether the values of the third set of values are uniformly distributed across a first partition generated using the first partition boundary value and across a second partition generated using the second partition boundary value; and
   determining whether to partition the data using the first candidate partition boundary value or the second candidate partition boundary value based at least in part on the determination of uniform distribution.

18. The non-transitory computer-readable medium of claim 17, wherein determining whether the values of the third set of values are uniformly distributed across the first partition and across the second partition is based at least in part on determining a first number of values distributed across the first partition is greater by a threshold margin than a second number of values distributed across the second partition.

19. The non-transitory computer-readable medium of claim 16, wherein the instructions that, when executed by the processor, further cause the processor to perform operations comprising:
   determining a difference between the first average value and the first value;
   determining an absolute value of the difference of the first average value and the first value, wherein the first deviation value is the absolute value;
   determining a difference between the second average value and the third value; and
   determining an absolute value of the difference of the second average value and the third value, wherein the second deviation value is the absolute value.

20. The non-transitory computer-readable medium of claim 15, wherein the instructions that, when executed by the processor, further cause the processor to perform operations comprising:
- identifying a fifth value of the first set of values and a sixth value of the second set of values;
- determining a midpoint of the fifth value and the sixth value; and
- determining the first plurality of bounded value sets and the second plurality of bounded value sets based at least in part on the midpoint, wherein the first plurality of bounded values is determined by adjusting the fifth value based at least in part on the midpoint, and wherein the second plurality of bounded values is determined by adjusting the sixth value based at least in part on the midpoint.

* * * * *